(12) United States Patent
Lim et al.

(10) Patent No.: US 11,546,976 B2
(45) Date of Patent: Jan. 3, 2023

(54) COOKING APPARATUS AND CONTROL METHOD THEREOF

(71) Applicant: SAMSUNG ELECTRONICS CO., LTD., Suwon-si (KR)

(72) Inventors: Gyu Sik Lim, Suwon-si (KR); Sun Hee Koo, Seoul (KR); Chang Min Baek, Seoul (KR); In Young Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 769 days.

(21) Appl. No.: 15/239,342

(22) Filed: Aug. 17, 2016

(65) Prior Publication Data

US 2016/0360578 A1    Dec. 8, 2016

Related U.S. Application Data

(63) Continuation of application No. 14/691,179, filed on Apr. 20, 2015, now Pat. No. 9,433,233, which is a
(Continued)

(30) Foreign Application Priority Data

Aug. 29, 2012  (KR) .......................... 10-2012-0095286
Jan. 26, 2013  (KR) .......................... 10-2013-0008967
May 16, 2013  (KR) .......................... 10-2013-0056086

(51) Int. Cl.
*H05B 6/64*         (2006.01)
*H05B 6/68*         (2006.01)
(Continued)

(52) U.S. Cl.
CPC .............. *H05B 6/6485* (2013.01); *A23L 3/01* (2013.01); *A23L 5/12* (2016.08); *A23L 5/15* (2016.08);
(Continued)

(58) Field of Classification Search
CPC .. H05B 6/6485; H05B 1/0261; H05B 6/6408; H05B 6/6435; H05B 6/645;
(Continued)

(56) References Cited

U.S. PATENT DOCUMENTS 3,569,656 A * 3/1971  White ................... H05B 6/645
                                                    219/685
4,396,817 A   8/1983  Eck et al.
(Continued)

FOREIGN PATENT DOCUMENTS

CA        1289627       9/1991
CA        1289627 C     9/1991
(Continued)

OTHER PUBLICATIONS

Chinese Office Action (Notice of Allowance) dated Sep. 27, 2017 in corresponding Korean Patent Application No. 2017-068364012 (Total of 8 pages).
(Continued)

*Primary Examiner* — Quang T Van
(74) *Attorney, Agent, or Firm* — Staas & Halsey LLP

(57) ABSTRACT

A cooking apparatus has a cooking chamber, a microwave unit to radiate microwaves to the cooking chamber, a convection unit to supply hot air to the cooking chamber, a grill unit to supply radiant heat to the cooking chamber, an input unit to receive a cooking command and a control unit to perform a cooking corresponding to the received cooking command by performing one of a first heating stage and a second heating stage, and after performing the one of the first heating stage and the second heating stage, performing the other one of the first heating stage and the second heating stage. In the first heating stage, the control unit operates the microwave unit and at least one of the convection unit and the grill unit, and in the second heating stage, the control unit
(Continued)

operates the grill unit and the convection unit while not operating the microwave unit.

10 Claims, 29 Drawing Sheets

Related U.S. Application Data continuation of application No. 14/010,898, filed on Aug. 27, 2013, now Pat. No. 9,035,224.

(51) Int. Cl.
  *A23L 5/10* (2016.01)
  *A23L 5/30* (2016.01)
  *A23L 3/01* (2006.01)
  *H05B 1/02* (2006.01)

(52) U.S. Cl.
  CPC .................. *A23L 5/17* (2016.08); *A23L 5/34* (2016.08); *H05B 1/0261* (2013.01); *H05B 6/645* (2013.01); *H05B 6/6408* (2013.01); *H05B 6/6435* (2013.01); *H05B 6/6473* (2013.01); *H05B 6/6494* (2013.01); *H05B 6/687* (2013.01); *A23V 2002/00* (2013.01)

(58) Field of Classification Search
  CPC .... H05B 6/6473; H05B 6/6494; H05B 6/687; H05B 6/68; H05B 6/80; H05B 6/6476; H05B 6/642; H05B 6/6482; H05B 6/64; H05B 6/66; H05B 6/666; A23L 5/34; A23L 5/15; A23L 1/0114; A23L 1/0128; A23L 1/0135; A23L 3/01; A23V 2002/00; F24C 7/08; F24C 1/04; F24C 15/32; F24C 7/02; F24C 7/04; F24C 7/00; F24C 14/02; F24C 14/00; F24C 15/325; F24C 15/2014; F24C 15/322; A47J 27/04; A21B 1/22; A21B 1/26; A21B 1/00; B65B 61/205; F24L 14/02; A01J 15/14; G06F 15/16; Y10S 99/14; Y02B 40/143; Y02B 40/00; H04L 12/2834; H04L 67/025
  USPC ....... 219/678–681, 685, 400, 704, 705, 451, 219/411, 413, 494, 702, 710, 467, 715, 219/725, 748, 746, 501, 485, 486, 492, 219/506, 393, 396, 398, 489, 758; 99/451, 325; 126/21 A, 20, 337 R, 332; 709/203, 208, 226, 229; 426/235, 523, 426/94, 100
  See application file for complete search history.

(56) References Cited

U.S. PATENT DOCUMENTS

| | | | |
|---|---|---|---|
| 4,418,262 A | 11/1983 | Noda | |
| 4,517,431 A * | 5/1985 | Ueda .................... | H05B 6/6455 219/719 |
| 5,128,158 A | 7/1992 | Chartrain et al. | |
| 6,815,644 B1 * | 11/2004 | Muegge ................... | F24C 1/04 126/332 |
| 7,946,224 B2 * | 5/2011 | McFadden ........... | H05B 6/6473 99/422 |
| 2003/0024925 A1 | 2/2003 | Graves ................. | H05B 6/6485 219/681 |
| 2007/0095822 A1 * | 5/2007 | Wiseman ................ | F24C 14/02 219/685 |
| 2007/0095824 A1 | 5/2007 | Carlsson et al. | |
| 2008/0206420 A1 | 8/2008 | McFadden | |
| 2009/0095738 A1 | 4/2009 | McNamee et al. | |
| 2010/0193507 A1 * | 8/2010 | Zimmer ............... | H05B 6/6485 219/681 |

FOREIGN PATENT DOCUMENTS

| | | | | |
|---|---|---|---|---|
| CH | 704 191 | | 5/2012 | |
| CN | 1888552 A | | 1/2007 | |
| CN | 101004273 A | | 7/2007 | |
| CN | 102478262 A | | 5/2012 | |
| DE | 704191 A2 | * | 5/2012 | ............. F24C 15/32 |
| EP | 0 478 082 B1 | | 4/1992 | |
| EP | 0478082 A1 | | 4/1992 | |
| EP | 1 458 220 | | 3/2004 | |
| EP | 2 233 838 | | 12/2008 | |
| EP | 2233838 B1 | * | 5/2014 | ........... H05B 6/6408 |
| GB | 1 394 311 | | 5/1975 | |
| GB | 2 439 520 | | 6/2006 | |
| JP | 2853558 | | 2/1999 | |
| JP | 3260058 | | 2/2002 | |
| JP | 2009-2546 | | 1/2009 | |
| JP | 2011-102661 | | 5/2011 | |
| KR | 1998-0003217 | | 3/1998 | |
| KR | 10-2007-0062805 | | 6/2007 | |

OTHER PUBLICATIONS

Chinese Notification of the Decision to Grant a Patent Right for Patent for Invention dated Oct. 10, 2017 in Chinese Patent Application No. 2013-10385080.2 (Total of 5 pages).
European Patent Office Summons to Oral Proceedings pursuant to Rule 115(1) EPC issued in Application No. 13181967.4 dated Nov. 6, 2017 (8 pages).
Communication pursuant to Article 94(3) EPC issued in European Application No. 16 153 527.3 dated Mar. 23, 2018 (4 pages).
Australian Office Action dated Nov. 23, 2016 in corresponding Australian Patent Application No. 2013219189.
Chinese Office Action dated Oct. 10, 2016 in corresponding Chinese Patent Application No. 201310325080.2.
Korean Notice of Allowance dated Jun. 18, 2018 in corresponding Korean Patent Application No. 10-2017-0180611, 5 pgs.
Indian Office Action dated Jul. 31, 2018 in corresponding Indian Patent Application No. 2762/MUM/2013, 6 pgs.
European Interlocutory decision in Opposition proceedings with Provision of the minutes dated Jul. 17, 2018 in corresponding European Patent Application No. 13 181 967.4, 76 pgs.
European Search Report issued Nov. 6, 2013, in corresponding European Application No. 13181967.
Restriction Requirement dated Oct. 31, 2013 in U.S. Appl. No. 14/010,898.
Office Action dated Jan. 16, 2014 in U.S. Appl. No. 14/010,898.
Notice of Allowance dated Apr. 27, 2016 in co-pending U.S. Appl. No. 14/691,179 (8 pages).
Non-Final OA dated Nov. 19, 2015 in co-pending U.S. Appl. No. 14/691,179 (8 pages).
Final Office Action dated Jun. 6, 2014 in U.S. Appl. No. 14/010,898.
Advisory Action dated Sep. 17, 2014 in U.S. Appl. No. 14/010,898.
Notice of Allowance dated Jan. 20, 2015 in U.S. Appl. No. 14/010,898.
Russian Decision on Grant dated May 14, 2015 in corresponding Russian Patent Application 2013140078.
U.S. Appl. No. 14/691,179, filed Apr. 20, 2015, Gyu Sik Lim, Samsung Electronics Co., LTD.
Korean Office Action dated Apr. 17, 2017 in corresponding Korean Patent Application No. 10-2013-0056086.
Australian Office Action dated Mar. 28, 2017 in corresponding Australian Patent Application No. 2013219189.
European Notice of Opposition dated Jan. 2, 2017 in corresponding European Patent Application No. 13181967.4.
European Notice of Opposition dated Feb. 6, 2017 in corresponding European Patent Application No. 13181967.4.
Chinese Office Action dated Jun. 16, 2016 in corresponding Chinese Patent Application No. 201310385080.2.
Australian Notice of Acceptance for Patent Application dated Jun. 7, 2017 in corresponding Australian Patent Application No. 2013219189.
European Office Action dated Mar. 9, 2020 from European Application No. 16153527.3, 5 pages.

(56) References Cited

OTHER PUBLICATIONS

Chinese Office Action dated Apr. 7, 2020 from Chinese Application No. 201711421283.7, 27 pages.
Indian Office Action dated Mar. 2, 2021 from Indian Application No. 202025020630.
European Office Action dates Sep. 29, 2021 from European Application No. 16153527.3.

* cited by examiner (a)

| Cooking Material | Weight | first cooking stage | | second cooking stage | | third cooking stage | |
|---|---|---|---|---|---|---|---|
| | | Heating Method | Time | Heating Method | Time | Heating Method | Time |
| Frozen Potato Chips | 300-350g | Microwave-Heating (600W) Convection-Heating (200°C) | 4min. | Slim Fry Heating (200°C) | 22min. | | |
| | 450-500g | Microwave-Heating (600W) Convection-Heating (200°C) | 6min. | Slim Fry Heating (200°C) | 23min. | | |
| Frozen Prawns | 200-250g | Slim Fry Heating (200°C) | 12min. | | | | |
| | 300-350g | Slim Fry Heating (200°C) | 15min. | | | | |
| Frozen Chicken Nuggets | 200-250g | Microwave-Heating (450W) Convection-Heating (200°C) | 5min. | Microwave-Heating (450W) Convection-Heating (200°C) | 2min. | Slim Fry Heating (200°C) | 5min. |
| | 350-400g | Microwave-Heating (450W) Convection-Heating (200°C) | 6min. | Microwave-Heating (450W) Convection-Heating (200°C) | 3min. | Slim Fry Heating (200°C) | 5min. |
| Frozen Potato Croquettes | 200-250g | Microwave-Heating (600W) Convection-Heating (200°C) | 4min. | Slim Fry Heating (200°C) | 12min. | | |
| | 300-350g | Microwave-Heating (600W) Convection-Heating (200°C) | 5min. | Slim Fry Heating (200°C) | 14min. | | |
| Frozen Spring Rolls | 200-250g | Microwave-Heating (450W) Convection-Heating (200°C) | 3min. | Slim Fry Heating (200°C) | 5min. | | |
| | 350-400g | Microwave-Heating (450W) Convection-Heating (200°C) | 5min. | Slim Fry Heating (200°C) | 7min. | | |
| Homemade French Fries | 300-350g | Microwave-Heating (600W) Convection-Heating (200°C) | 8min. | Slim Fry Heating (200°C) | 18min. | | |
| | 450-500g | Microwave-Heating (600W) Convection-Heating (200°C) | 14min. | Slim Fry Heating (200°C) | 20min. | | |
| Potato Wedges | 200-250g | Microwave-Heating (300W) Grill-Heating | 10min. | Slim Fry Heating (200°C) | 5min. | | |
| | 300-350g | Microwave-Heating (300W) Grill-Heating | 12min. | Slim Fry Heating (200°C) | 5min. | | |
| | 400-450g | Microwave-Heating (300W) Grill-Heating | 14min. | Slim Fry Heating (200°C) | 5min. | | |
| Drumsticks | 200-250g | Microwave-Heating (300W) Grill-Heating | 10min. | Microwave-Heating (300W) Convection-Heating (200°C) | 7min. | Slim Fry Heating (200°C) | 7min. |
| | 300-350g | Microwave-Heating (300W) Grill-Heating | 11min. | Microwave-Heating (300W) Convection-Heating (200°C) | 8min. | Slim Fry Heating (200°C) | 7min. |
| | 400-450g | Microwave-Heating (300W) Convection-Heating (200°C) | 13min. | Microwave-Heating (300W) Convection-Heating (200°C) | 9min. | Slim Fry Heating (200°C) | 8min. |
| Apple Halves | 300-350g | Microwave-Heating (180W) Grill-Heating | 6min. | Slim Fry Heating (180°C) | 4min. | | |
| | 400-450g | Microwave-Heating (180W) Grill-Heating | 9min. | Slim Fry Heating (180°C) | 4min. | | |

COOKING APPARATUS AND CONTROL METHOD THEREOF

CROSS-REFERENCE TO RELATED APPLICATIONS

This application is a Continuation of U.S. application Ser. No. 14/691,179, filed on Apr. 20, 2015, which is a Continuation of Ser. No. 14/010,898, filed on Aug. 27, 2013, in the United States Patent and Trademark Office and claims the benefit of Korean Patent Application Nos. 10-2012-0095286, 10-2013-0008967 and 10-2013-0056086, filed on Aug. 29, 2012, Jan. 26, 2013 and May 16, 2013, respectively, in the Korean Intellectual Property Office, the disclosures of each of which are incorporated herein by reference.

BACKGROUND

1. Field

Embodiments of the present disclosure relate to a cooking apparatus and control method thereof to achieve a fry-cooking process using microwave-heating, convection-heating and grill-heating.

2. Description of the Related Art

A microwave oven is an appliance to cook food by supplying microwaves to a cooking chamber.

Recently-developed microwave ovens are equipped with a grill-heating unit to generate radiant heat and/or a convection-heating unit to generate convection heat in addition to a microwave-heating unit to generate microwaves, to thereby cook food in various ways. Further, microwave ovens provide a function of automatically cooking food in accordance with the kind of materials to be cooked by using various heating sources. Microwave ovens provide functions of heating food using microwaves, roasting food using a grill-heating unit, or cooking food using a convection-heating unit.

However, different from cooking methods of directly supplying thermal energy to food, such as a roast-cooking method, a fry-cooking method includes processes of supplying thermal energy to oil and cooking food through the heated oil. Thus frying is hard to realize using microwave ovens.

SUMMARY

It is an aspect of the present disclosure to provide a cooking apparatus and control method thereof to achieve a fry-cooking process using functions of the cooking apparatus.

Additional aspects will be set forth in part in the description which follows and, in part, will be obvious from the description, or may be learned by practice of the invention.

In accordance with one aspect, a control method of a cooking apparatus including a cooking chamber, a microwave-heating unit to radiate microwaves to the cooking chamber, a convection-heating unit to supply hot air to the cooking chamber, and a grill-heating unit to supply radiant heat to the cooking chamber, includes receiving a user fry-cooking command, performing a microwave-heating stage of activating at least one of the convection-heating unit and the grill-heating unit and activating the microwave-heating unit, and performing a slim fry stage of activating the grill-heating unit and the convection-heating unit without activating the microwave-heating unit. The microwave-heating stage and the slim fry stage are performed corresponding to the user fry-cooking command.

The performing the slim fry stage may include continuously activating the grill-heating unit and the convection-heating unit until a temperature of the cooking chamber reaches a preset target temperature, and intermittently activating the grill-heating unit and the convection-heating unit after the temperature of the cooking chamber reaches the preset target temperature.

The intermittently activating the grill-heating unit and the convection-heating unit may include repeating turn-on and turn-off of the grill-heating unit and the convection-heating unit.

The performing the microwave-heating stage may include activating the convection-heating unit and the microwave-heating unit.

The performing the microwave-heating stage may include activating the grill-heating unit and the microwave-heating unit.

The receiving the user fry-cooking command may include receiving inputs of user selections about the kind of materials to be cooked and a weight thereof.

The activating the microwave-heating unit may include deciding an output power of the microwave-heating unit in accordance with the kind of the materials to be cooked and the weight thereof, and activating the microwave-heating unit with the decided output power.

The activating the convection-heating unit may include deciding the temperature of the cooking chamber in accordance with the kind of the materials to be cooked and the weight thereof, and activating the convection-heating unit in order to hold the temperature of the cooking chamber at the decided temperature.

If the microwave-heating stage is performed by activating the convection-heating unit and the microwave-heating unit, a time of the slim fry stage may be longer than a time of the microwave-heating stage.

If the microwave-heating stage is performed by activating the grill-heating unit and the microwave-heating unit, a time of the microwave-heating stage may be longer than a time of the slim fry stage.

The user fry-cooking command may be input through a unitary button provided at a control panel of the cooking apparatus.

In accordance with one aspect, a cooking apparatus includes a cooking chamber, a microwave-heating unit to radiate microwaves to the cooking chamber, a convection-heating unit to supply hot air to the cooking chamber, a grill-heating unit to supply radiant heat to the cooking chamber, a crusty plate configured to be heated by the microwaves, an input unit to receive a user fry-cooking command, and a control unit. When the user fry-cooking command is input, the control unit performs a microwave-heating stage of activating at least one of the convection-heating unit and the grill-heating unit and activating the microwave-heating unit, and performs a slim fry stage of activating the grill-heating unit and the convection-heating unit without activating the microwave-heating unit.

The cooking apparatus may further include a temperature detecting part to detect an internal temperature of the cooking chamber. In the slim fry stage, the control unit may continuously activate the grill-heating unit and the convection-heating unit until the internal temperature of the cooking chamber detected by the temperature detecting part reaches a preset target temperature, and may intermittently activate the grill-heating unit and the convection-heating unit when the internal temperature of the cooking chamber reaches the preset target temperature.

The control unit may turn on and off the grill-heating unit and the convection-heating unit at the same time in order to intermittently activate the grill-heating unit and the convection-heating unit.

The control unit may activate the convection-heating unit and the microwave-heating unit in the microwave-heating stage.

The control unit may activate the grill-heating unit and the microwave-heating unit in the microwave-heating stage.

The crusty plate may include a metal plate having high heat conductivity, and a heating element to heat the metal plate by being heated by the microwaves.

The heating element may be made of a ferrite-rubber composite.

The cooking apparatus may further include a high rack, on which materials to be cooked are placed when the microwave-heating stage is performed by activating the grill-heating unit and the microwave-heating unit.

The cooking apparatus may further include a low rack, on which materials to be cooked are placed when the microwave-heating stage is performed by activating the convection-heating unit and the microwave-heating unit.

In accordance with one aspect, a control method of a cooking apparatus including a cooking chamber, a microwave-heating unit to radiate microwaves to the cooking chamber, and a convection-heating unit to supply hot air to the cooking chamber, includes receiving a user fry-cooking command, performing a microwave-heating stage of activating the microwave-heating unit, and performing a slim fry stage of activating the convection-heating unit without activating the microwave-heating unit. The microwave-heating stage and the slim fry stage are performed corresponding to the user fry-cooking command.

The performing the slim fry stage may include continuously activating the convection-heating unit until a temperature of the cooking chamber reaches a preset target temperature, and intermittently activating the convection-heating unit after the temperature of the cooking chamber reaches the preset target temperature.

A time of the slim fry stage may be longer than a time of the microwave-heating stage.

The user fry-cooking command may be input through a unitary button provided at a control panel of the cooking apparatus.

As described above, the cooking apparatus and control method thereof achieve the fry-cooking process using the microwaves, radiant heat and convection heat without dipping the materials to be cooked in oil.

BRIEF DESCRIPTION OF THE DRAWINGS

These and/or other aspects will become apparent and more readily appreciated from the following description of the embodiments, taken in conjunction with the accompanying drawings of which:

FIG. 25 is a table abstracting the whole cooking methods depicted in FIGS. 16 through 24.

DETAILED DESCRIPTION

Figure 1A:
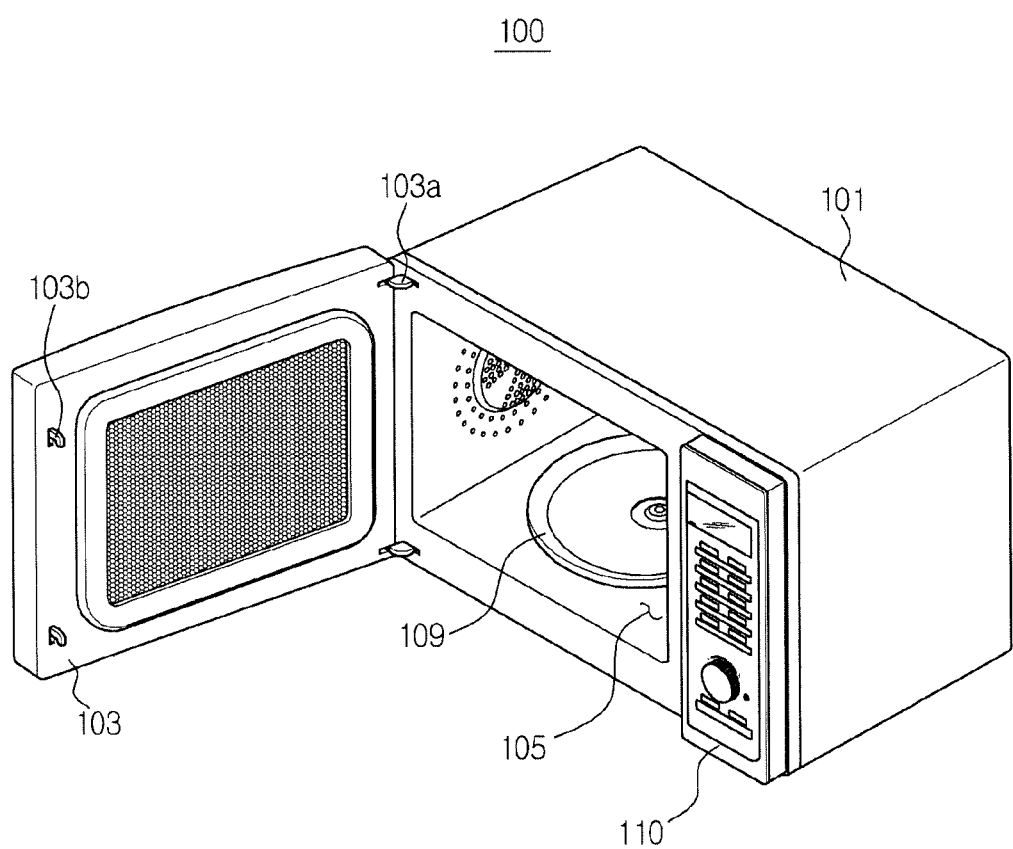
FIG. 1a is a view showing an exterior appearance of a cooking apparatus according to a embodiment.

Reference will now be made in detail to the embodiments, examples of which are illustrated in the accompanying drawings, wherein like reference numerals refer to like elements throughout.

Figure 1B:
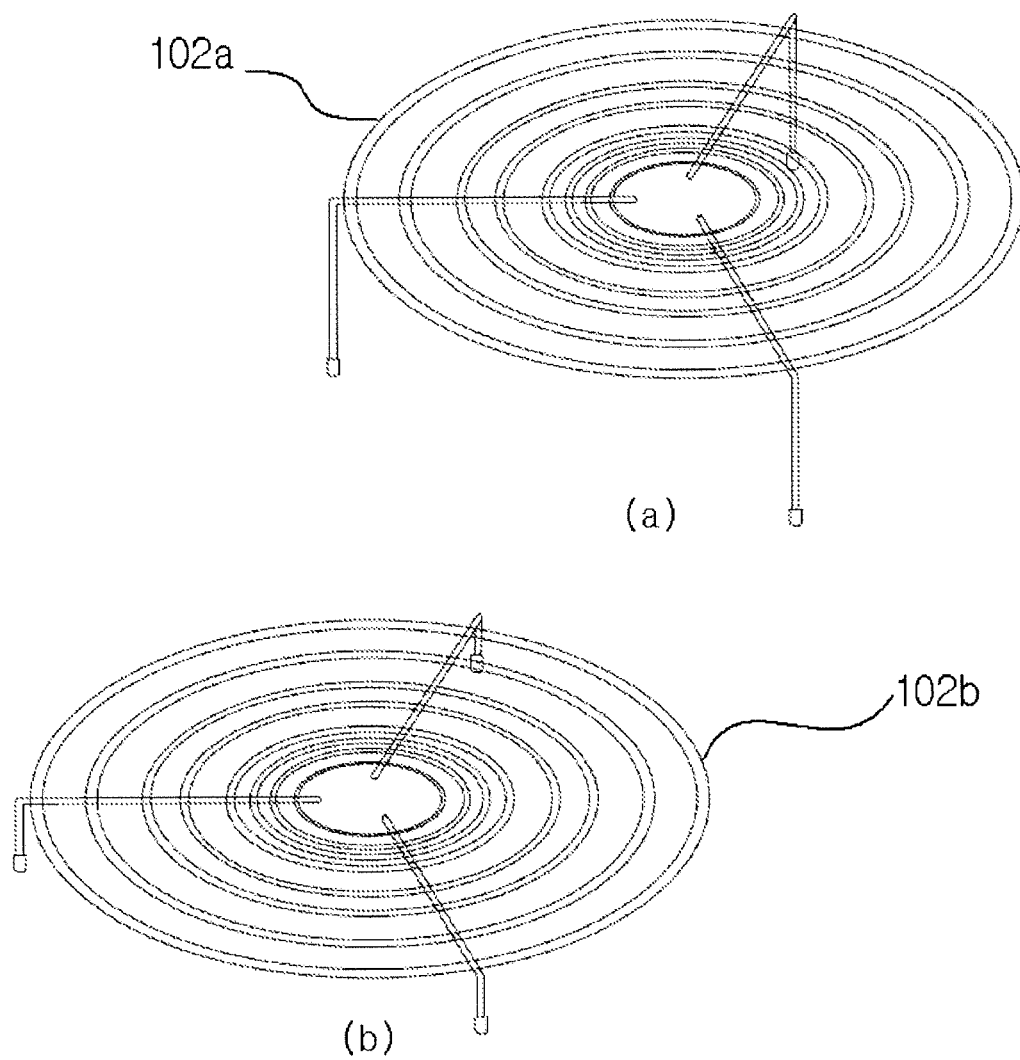
FIGS. 1b and 1c are views showing additional accessories of the cooking apparatus according to the embodiment.
Figure 1C:
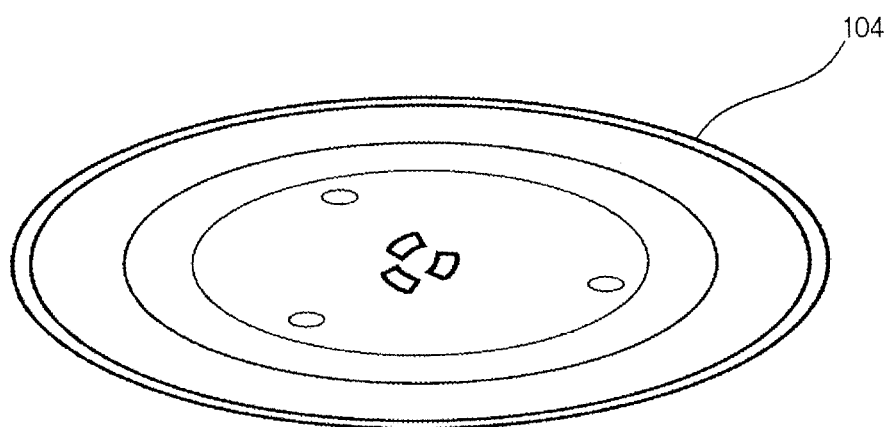

FIG. 1a is a view showing an exterior appearance of a cooking apparatus according to a embodiment, and FIGS. 1b and 1c are views showing additional accessories of the cooking apparatus according to the embodiment.

Referring to FIGS. 1a through 1c, the cooking apparatus 100 includes a main body 101 defining an exterior appearance, a cooking chamber 105 provided inside the main body 101 to receive materials to be cooked therein, a door 103 provided at a front portion of the main body 101 to open and close an entrance of the cooking chamber 105, an electronic chamber 107 provided to the right of the cooking chamber 105, in which a microwave-heating unit 120 is mounted, and a crusty plate 109 on which materials to be cooked are placed.

A temperature sensor, which will be described later, to measure an internal temperature of the cooking chamber 105 may be provided at an inner rear portion of the cooking chamber 105. A heat insulating material (not shown) is provided in a space between the main body 101 and the cooking chamber 105. The heat insulating material wraps the cooking chamber 105 to thermally insulate the cooking chamber 105 from the exterior thereof.

The door 103 swings on a hinge 103a connecting a side portion of the door 103 and the main body 101. When the door 103 is closed, the door 103 is fixed to the main body 101 by a latch 103b provided at the other side portion of the door 103, opposite to the hinge 103a.

As shown in FIG. 1, the door 103 may be swingably mounted to a front-left side of the main body 101 using the hinge 103a so that a user may open the door 103 using one hand and conveniently put or take materials to be cooked into/out of the cooking chamber 105 using the other hand. Alternatively, as shown in FIG. 6, the door 103 may be swingably mounted to a front bottom of the main body 101 using the hinge 103a so that a user may safely put or take materials to be cooked into/out of the cooking chamber 105 using both hands.

The crusty plate 109, on which materials to be cooked are placed, may be demountably provided in the cooking chamber 105.

The crusty plate 109 may be configured as a heating element, such as a ferrite-rubber composite, which is heated by microwaves radiated from the microwave-heating unit 120. The crusty plate 109 may further include a metal plate having high heat conductivity in order to transfer the heat generated from the heating element to materials to be cooked. In such a case that the heating element is configured as a ferrite-rubber composite, the ferrite-rubber composite may function as an electric insulator and prevent spark generation at the metal plate caused by the microwaves.

The crusty plate 109 is heated by the microwaves radiated from the microwave-heating unit 120, thereby directly heating a bottom of the materials to be cooked.

The cooking apparatus 100 may further include a turntable 104 to rotate materials to be cooked in the cooking chamber 105, and a high rack 102a and a low rack 102b to simultaneously cook two or more materials.

Figure 2:
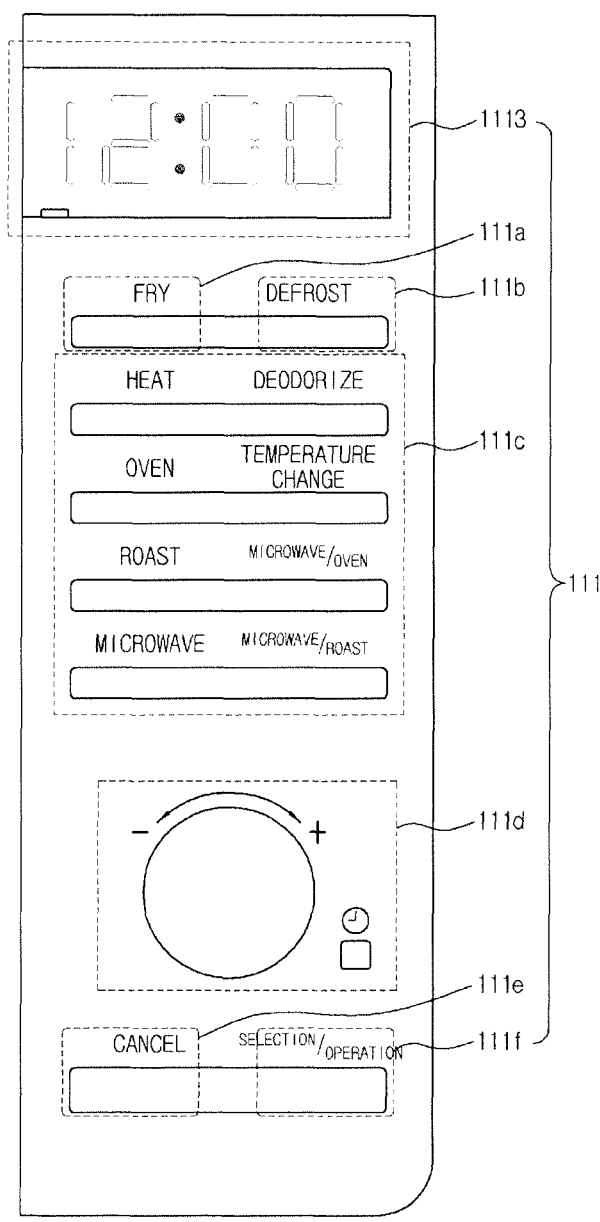
FIG. 2 is a view showing a control panel of the cooking apparatus according to the embodiment.

FIG. 2 is a view showing a control panel of the cooking apparatus according to the embodiment.

As shown in FIG. 2, the control panel 110 is positioned at the front-right portion of the main body 101. The control panel 110 includes an input unit 111 to receive inputs of user selections, and a display unit 113 to display the operation state of the cooking apparatus 100.

The input unit 111 is positioned at a lower portion of the control panel 110, and receives inputs of various user selections of cooking start, cooking time, cancel and pause. The input unit 111 may be configured as a button type switch, a membrane type switch, a dial switch and the like.

The input unit 111 may include a fried food button 111a to receive a command for fry-cooking, a defrost button 111b to receive a command for defrosting, function select buttons 111c to choose one of the heating processes of microwave-heating, grill-heating and convection-heating, an adjustment dial 111d to input a cooking time or a weight of materials to be cooked, a cancel button 111e to receive a command for operation stop of the cooking apparatus 100, and a selection/operation button 111f to receive a command for operation of the cooking apparatus 100.

The input unit 111, as shown in FIG. 2, also includes printed characters explaining the function of each button 111a through 111f so that a user may know the function of the corresponding button.

The display unit 113 is positioned at an upper portion of the control panel 110. The display unit 113 displays the operation state of the output of the cooking apparatus 100 and a cooking time. The display unit 113 may be configured as a liquid crystal display (LCD) panel, a light emitting diode (LED) panel or the like.

In the cooking apparatus 100 according to the embodiment, the input unit 111 and the display unit 113 are segregated from each other; however, embodiments are not limited thereto. The input unit 111 and the display unit 113 may be configured as an integrated touch screen panel (TSP).

Figure 3:
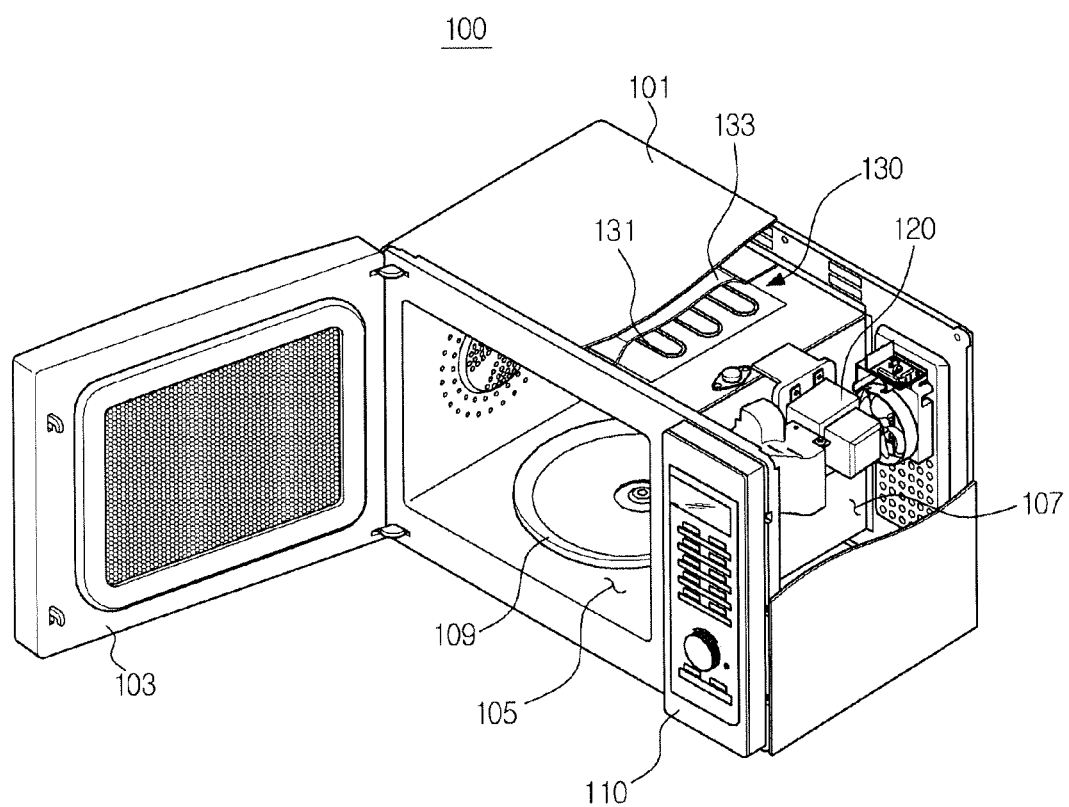
FIG. 3 is a view showing a microwave-heating unit and a grill-heating unit of the cooking apparatus according to the embodiment.
Figure 4:
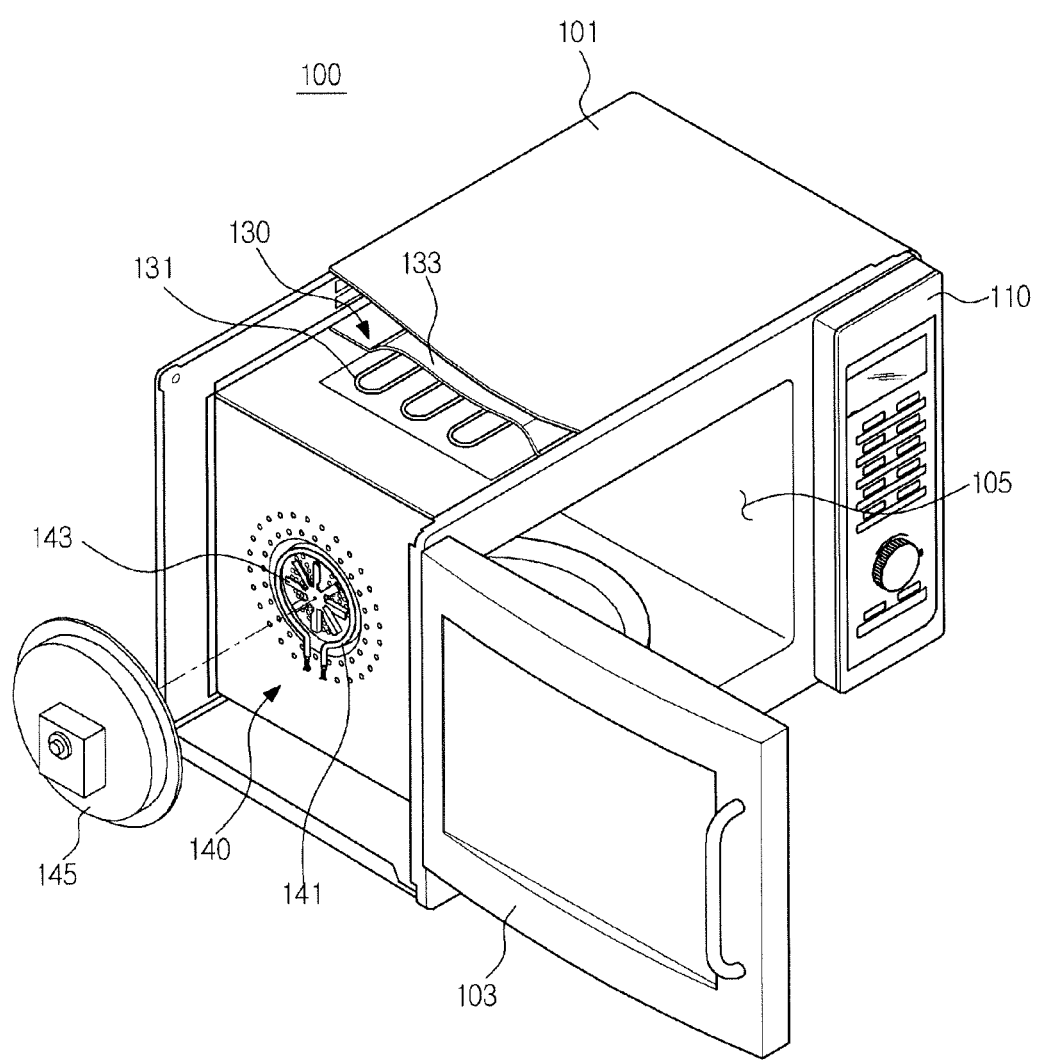
FIG. 4 is a view showing a convection-heating unit of the cooking apparatus according to the embodiment.
Figure 5:
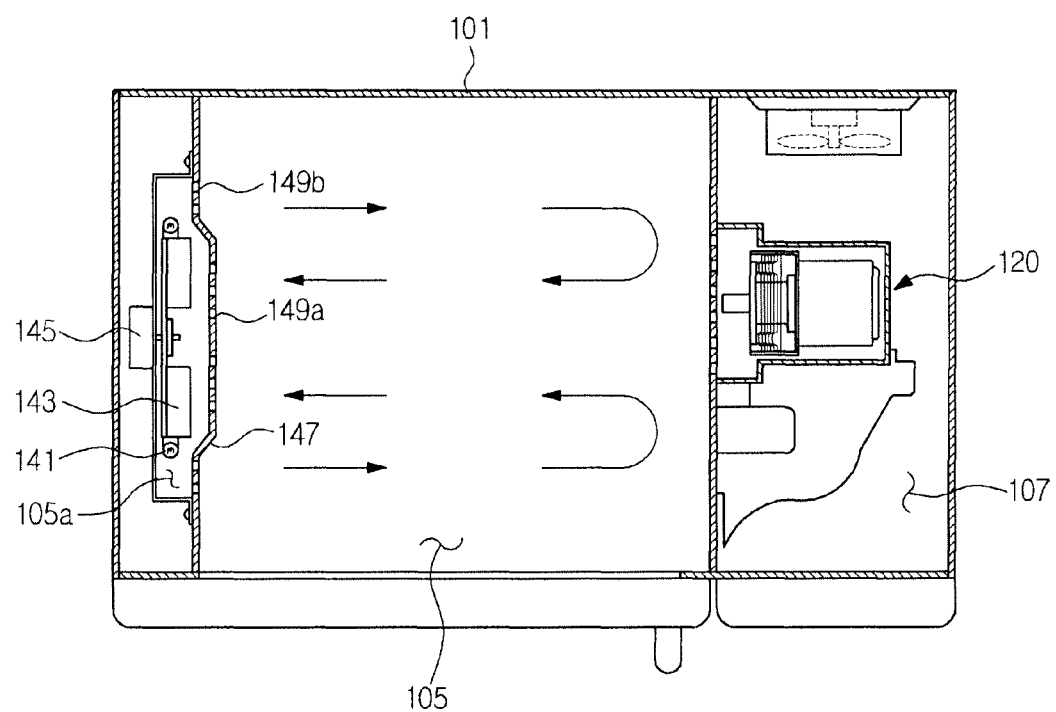
FIG. 5 is a view showing internal airflow in a cooking chamber by the convection-heating unit depicted in FIG. 4.

FIG. 3 is a view showing a microwave-heating unit and a grill-heating unit of the cooking apparatus according to the embodiment, FIG. 4 is a view showing a convection-heating unit of the cooking apparatus according to the embodiment, and FIG. 5 is a view showing internal airflow in the cooking chamber by the convection-heating unit depicted in FIG. 4.

Referring to FIGS. 3 and 4, the cooking apparatus 100 includes the microwave-heating unit 120 to radiate microwaves into the cooking chamber 105, the grill-heating unit 130 to emit radiant heat toward materials to be cooked in the cooking chamber 105, and the convection-heating unit 140 to supply hot air into the cooking chamber 105.

The microwave-heating unit 120 is disposed in the electronic chamber 107 provided to the right of the cooking chamber 105. The microwave-heating unit 120 includes a magnetron 121 to generate microwaves which will be radiated into the cooking chamber 105, and a high voltage transformer (not shown) to apply high voltage to the magnetron 121.

The microwave-heating unit 120 radiates microwaves of 2.45 GHz into the cooking chamber 105 through the right wall plate of the cooking chamber 105, thereby heating materials to be cooked in the cooking chamber 105. The microwaves radiated from the microwave-heating unit 120 may penetrate materials to be cooked in the cooking chamber 105 and produce heat inside the materials to be cooked.

The microwave-heating unit 120 may be configured as a fixed output microwave-heating unit which generates only the microwaves of maximum output power. The fixed output microwave-heating unit may radiate microwaves of various powers by adjusting a ratio of a microwave radiation time to a non-radiation time. For example, in such a case that the maximum output is 900 W, the microwave-heating unit may radiate microwaves of an average of 600 W by repeating the radiation time of 20 seconds and the non-radiation time of 10 seconds. However, embodiments are not limited thereto. The microwave-heating unit 120 may also be configured as a variable output microwave-heating unit which radiates microwaves of various powers by using an inverter as a driving circuit.

The grill-heating unit 130 is provided above the cooking chamber 105. The grill-heating unit 130 includes a grill heater 131 to emit radiant heat, and a reflection plate 133 to focus the emitted radiant heat on the interior of the cooking chamber 105. The grill heater 131 may be configured as a halogen lamp which emits high radiant heat, or a heating wire which emits heat by electric resistance.

The radiant heat emitted from the grill heater 131 is directly radiated into the cooking chamber 105, or is reflected from the reflection plate 133 and then radiated into the cooking chamber 105, thereby heating materials to be cooked in the cooking chamber 105.

The convection-heating unit 140 is provided to the left of the cooking chamber 105. The convection-heating unit 140 includes a convection heater 141 to generate hot air, a convection circulation fan 143 to supply the hot air around the convection heater 141 into the cooking chamber 105, and a convection driving motor 145 to rotate the convection circulation fan 143.

The left wall plate of the cooking chamber 105 has a depressed portion, which defines a circulation fan accommodation space 105a. The convection heater 141 and the convection circulation fan 143 are disposed inside the circulation fan accommodation space 105*a*, and the convection driving motor 145 is disposed outside the circulation fan accommodation space 105*a*.

By the rotation of the blades, the convection circulation fan 143 sucks the internal air from the cooking chamber 105 into the circulation fan accommodation space 105*a*, and sends the air in a radial direction. The convection heater 141 is disposed around the outer circumstance of the convection circulation fan 143, and heats the air blown from the convection circulation fan 143. The convection heater 141 may be configured as a heating wire which emits Joule's heat by electric resistance.

A fan cover 147 is mounted between the circulation fan accommodation space 105*a* and the cooking chamber 105. The fan cover 147 functions to separate the circulation fan accommodation space 105*a* from the cooking chamber 105. A plurality of inlet holes 149*a* are provided at the central portion of the fan cover 147. The internal air in the cooking chamber 105 flows into the circulation fan accommodation space 105*a* through the inlet holes 149*a*. A plurality of outlet holes 149*b* are provided along the border portion of the fan cover 147. The hot air in the circulation fan accommodation space 105*a* flows into the cooking chamber 105 through the outlet holes 149*b*.

The convection circulation fan 143 sucks the internal air from the cooking chamber 105 through the inlet holes 149*a*, and sends the air in a radial direction. The convection heater 141 heats the air blown from the convection circulation fan 143. The hot air heated by the convection heater 141 is supplied into the cooking chamber 105 through the outlet holes 149*b*.

Referring to FIG. 5, the hot air heated by the convection heater 141 is supplied into the cooking chamber 105 by the convection circulation fan 143, and then flows toward the right side surface of the cooking chamber 105 along the top and bottom surfaces and the front and rear surfaces of the cooking chamber 105. After arriving at the right side surface of the cooking chamber 105, the hot air gathers at the middle portion of the right side surface, and then flows back toward the left side surface across the middle portion of the cooking chamber 105. As described above, the hot air heated by the convection heater 141 circulates in the cooking chamber 105 by the convection circulation fan 143, thereby heating materials to be cooked in the cooking chamber 105.

Figure 6A:
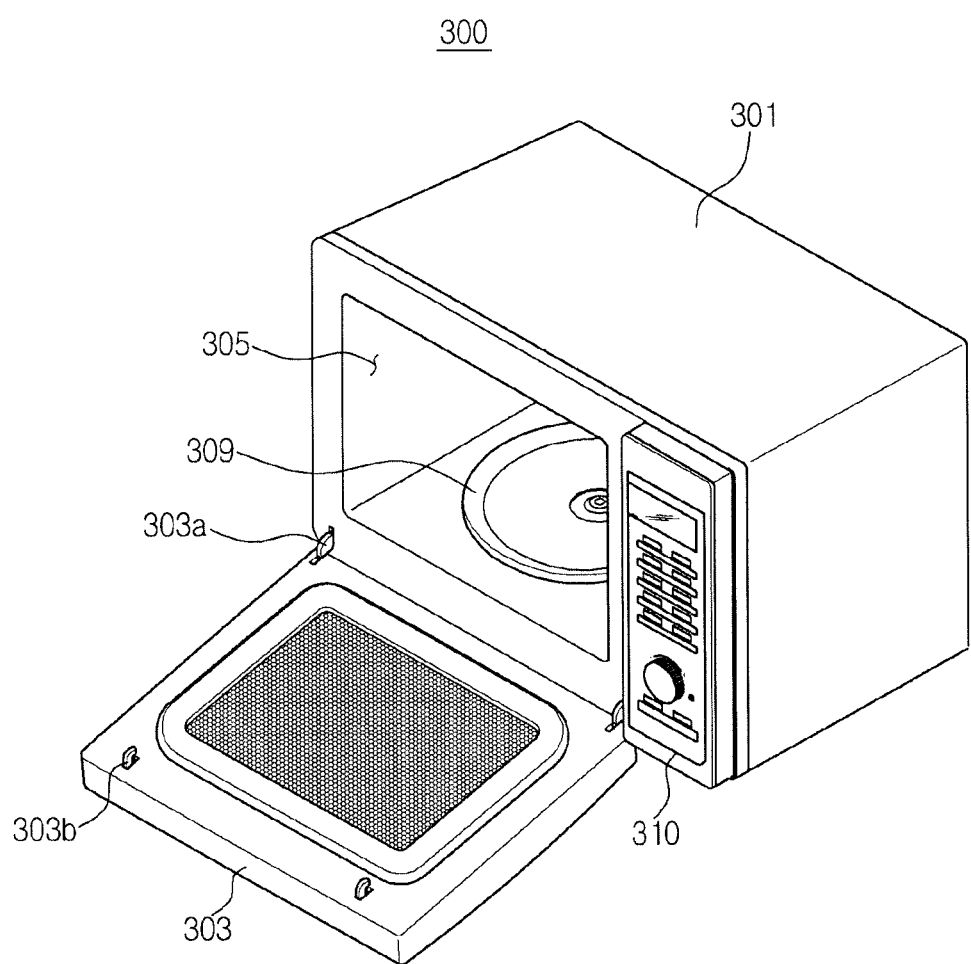
FIG. 6a is a view showing an exterior appearance of a cooking apparatus according to a embodiment.
Figure 6B:
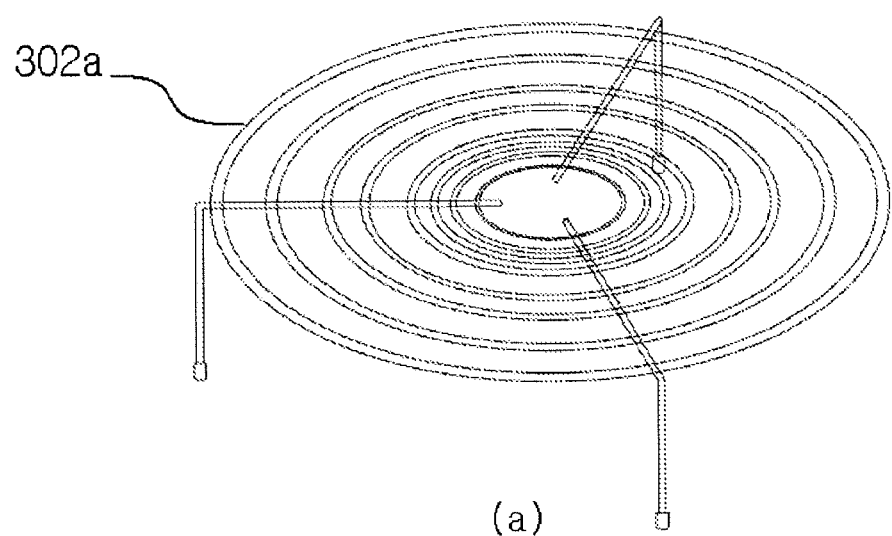
FIGS. 6b and 6c are views showing additional accessories of the cooking apparatus according to the embodiment.
Figure 6B:
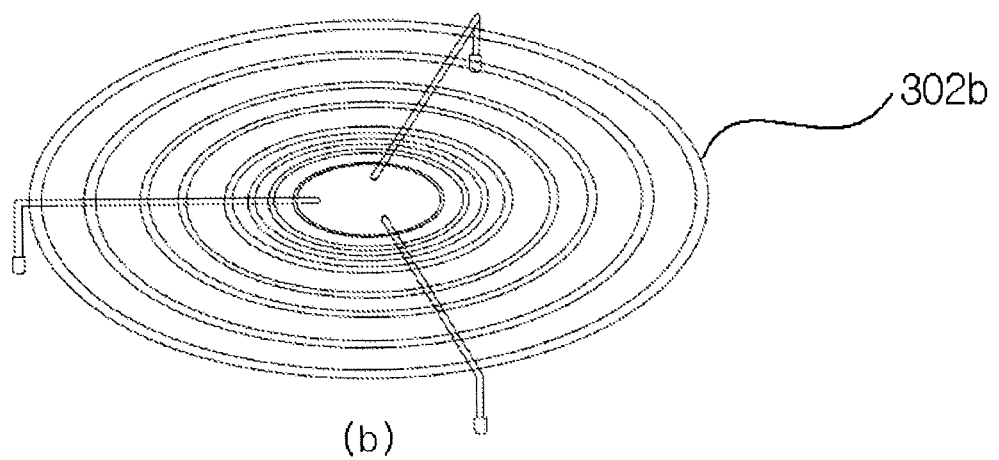
Figure 6C:
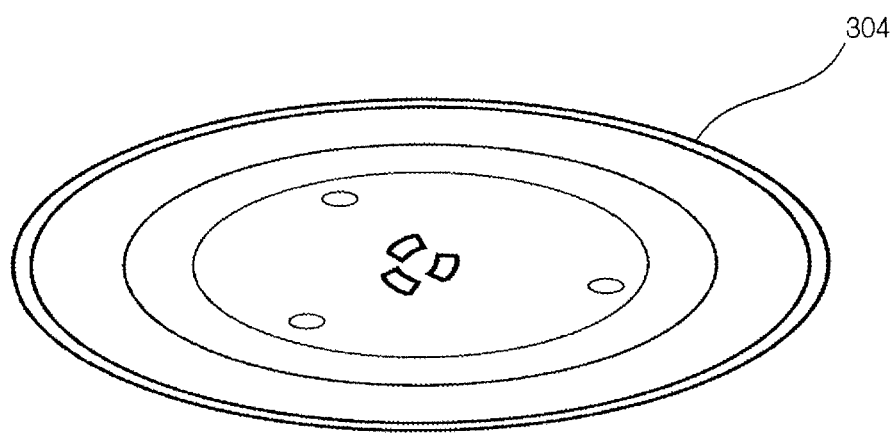
Figure 7:
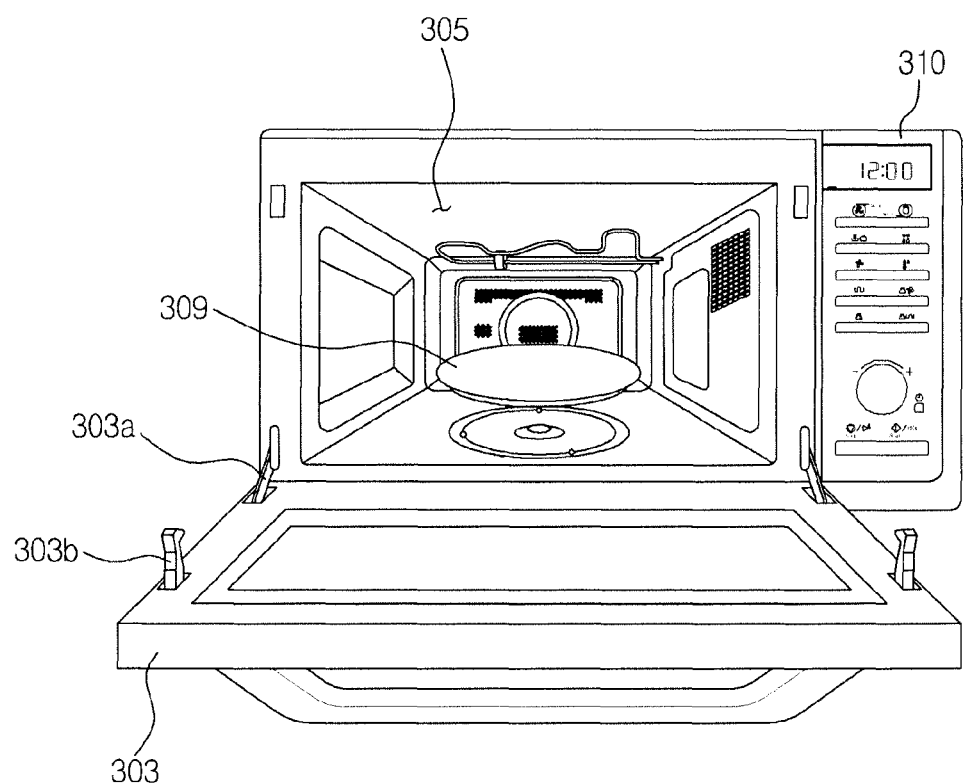
FIG. 7 is a view showing a front appearance of the cooking apparatus according to the embodiment.

FIG. 6*a* is a view showing an exterior appearance of a cooking apparatus according to an embodiment, FIGS. 6*b* and 6*c* are views showing additional accessories of the cooking apparatus according to the embodiment, and FIG. 7 is a view showing a front appearance of the cooking apparatus according to the embodiment.

As shown in FIGS. 6*a*, 6*b* and 7, the cooking apparatus 300 includes a main body 301 defining an exterior appearance, a cooking chamber 305 provided inside the main body 301 to receive materials to be cooked therein, a door 303 provided at a front portion of the main body 301 to open and close an entrance of the cooking chamber 305, an electronic chamber 307 provided to the right of the cooking chamber 305, in which a microwave-heating unit 320 is mounted, and a crusty plate 309 on which materials to be cooked are placed.

Since the main body 301, the cooking chamber 305, the electronic chamber 307 and the crusty plate 309 of the cooking apparatus 300 according to the second embodiment of the present invention have the same functions and structures as the main body 101, the cooking chamber 105, the electronic chamber 107 and the crusty plate 109 of the cooking apparatus 100 according to the first embodiment of the present invention described above with reference to FIG. 1, explanation thereof will be omitted.

The door 303 swings on a hinge 303*a* connecting a side portion of the door 303 and the main body 301. When the door 303 is closed, the door 303 is fixed to the main body 301 by a latch 303*b* provided at the other side portion of the door 303, opposite to the hinge 303*a*.

As shown in FIG. 6*a*, the door 303 may be swingably mounted to a front bottom of the main body 301 using the hinge 303*a* so that a user may safely put or take materials to be cooked into/out of the cooking chamber 305 using both hands. Alternatively, as shown in FIG. 1, the door 303 may be swingably mounted to a front-left side of the main body 301 using the hinge 303*a* so that a user may open the door 303 using one hand and conveniently put or take materials to be cooked into/out of the cooking chamber 305 using the other hand.

The cooking apparatus 300 may further include a turntable 304 to rotate materials to be cooked in the cooking chamber 305, and a high rack 302*a* and a low rack 302*b* to simultaneously cook two or more materials.

Figure 8:
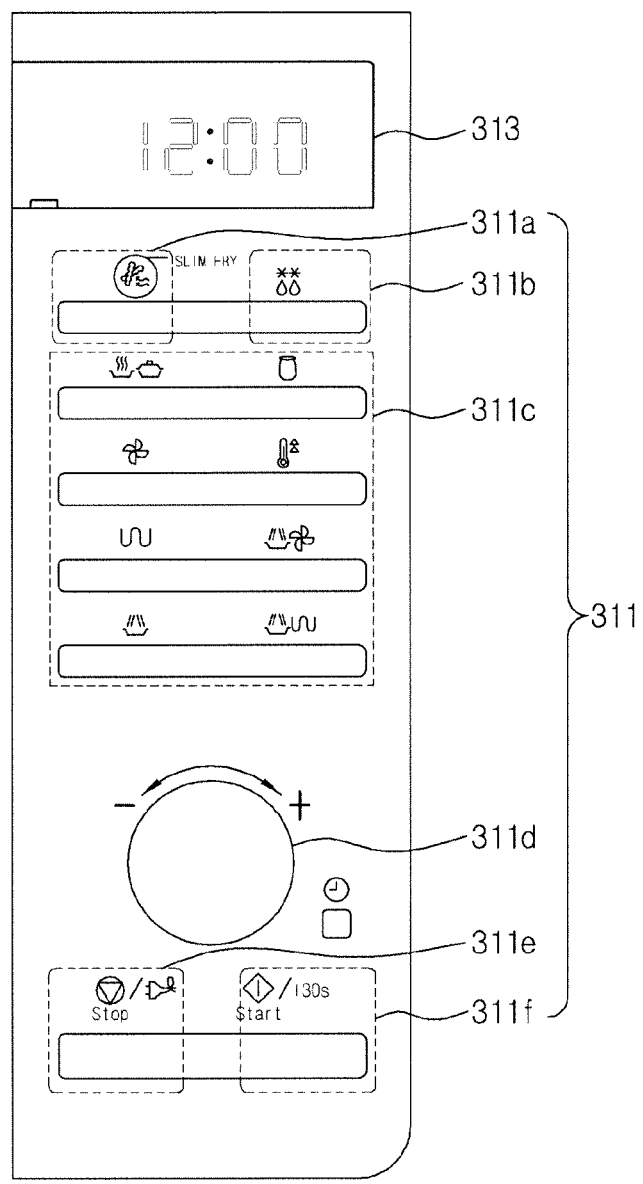
FIG. 8 is a view showing a control panel of the cooking apparatus according to the embodiment.

FIG. 8 is a view showing a control panel 310 of the cooking apparatus according to the embodiment.

As shown in FIG. 8, the control panel 310 is positioned at the front-right portion of the main body 301. The control panel 310 includes an input unit 311 to receive inputs of user selections, and a display unit 313 to display the operation state of the cooking apparatus 300.

The input unit 311 includes a fried food button 311*a*, a defrost button 311*b*, function select buttons 311*c*, an adjustment dial 311*d*, a cancel button 311*e*, and a selection/ operation button 311*f*. The functions of the respective buttons 311*a* through 311*f* are the same as those of the buttons 111*a* through 111*f* of the input unit 111 of the cooking apparatus 100 according to the first embodiment of the present invention.

The input unit 311, as shown in FIG. 7, also includes printed symbols representing the function of each button 311*a* through 311*f* so that a user may know the function of the corresponding button.

Since the constitution and function of the display unit 313 are the same as those of the display unit 113 of the cooking apparatus 100 according to the embodiment described above with reference to FIG. 2, explanation thereof will be omitted.

Figure 9:
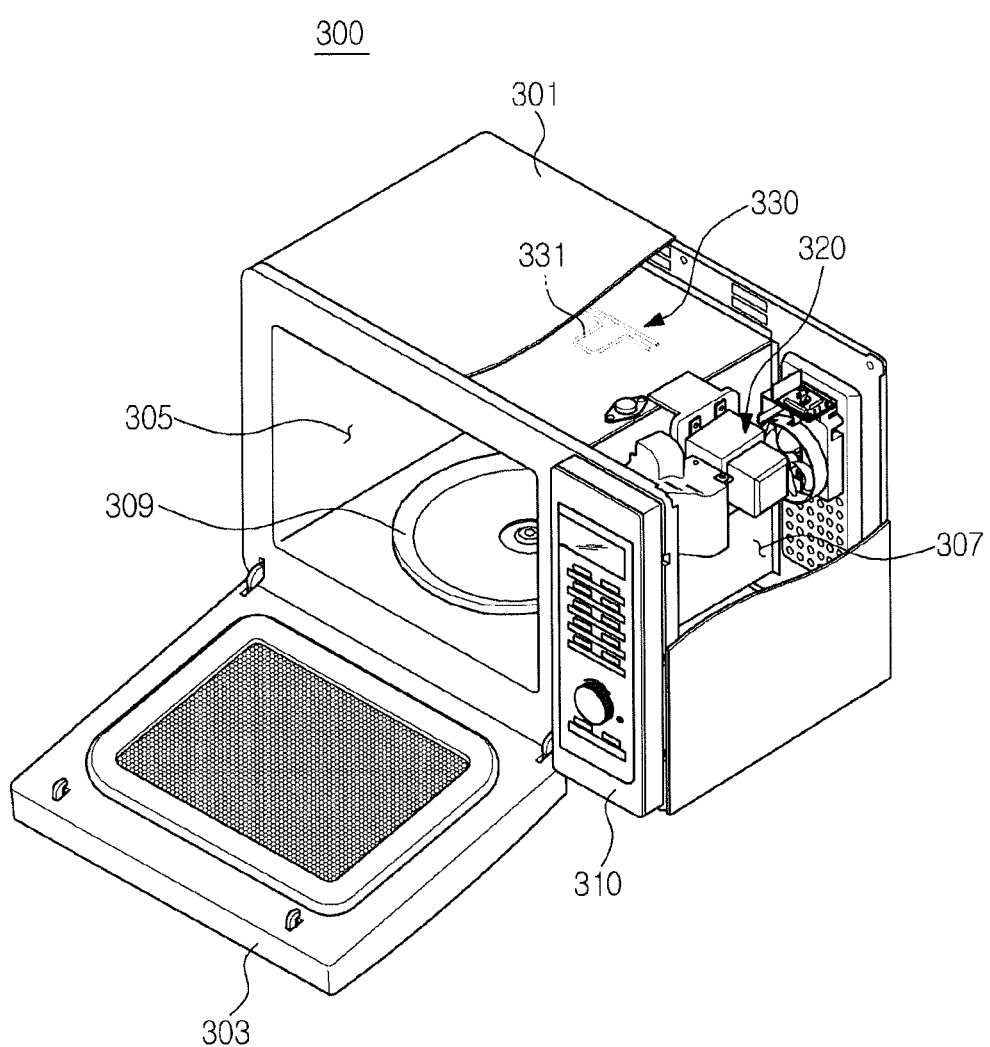
FIG. 9 is a view showing a microwave-heating unit and a grill-heating unit of the cooking apparatus according to the embodiment.
Figure 10:
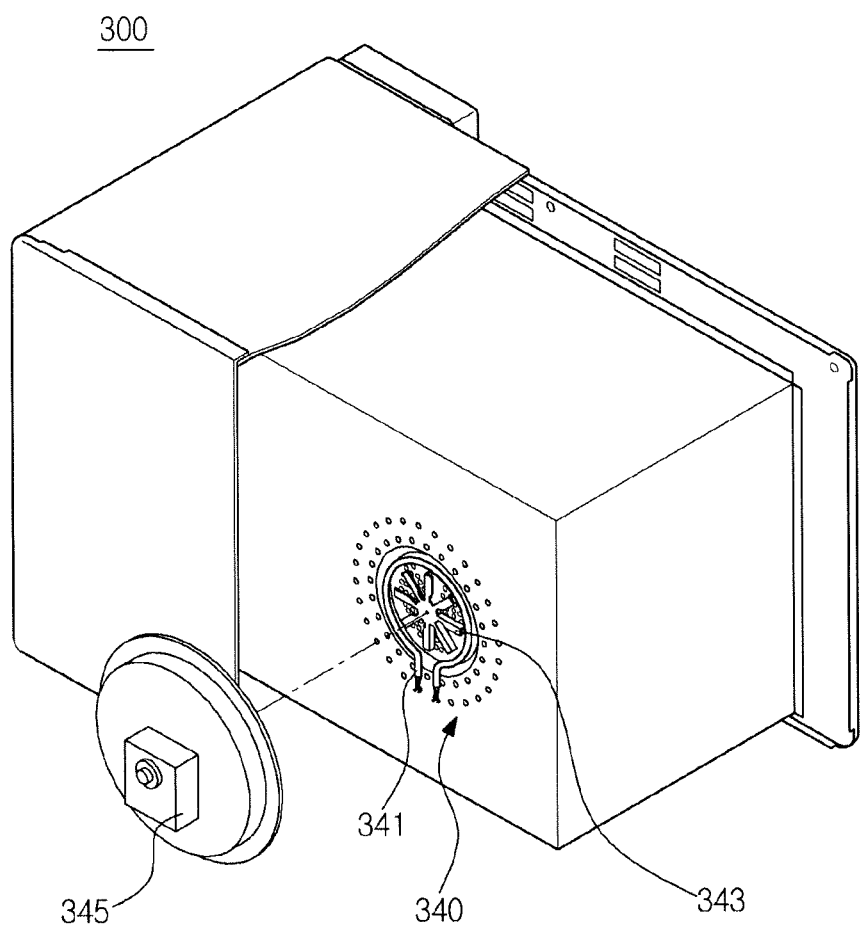
FIG. 10 is a view showing a convection-heating unit of the cooking apparatus according to the embodiment.
Figure 11:
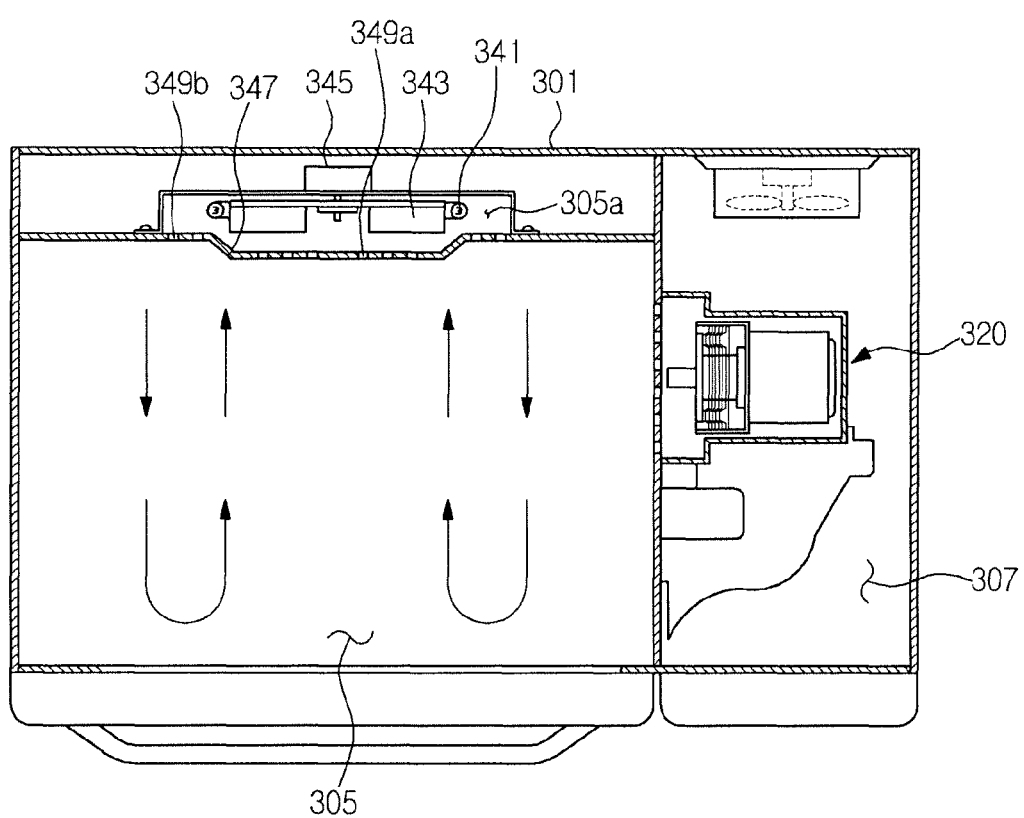
FIG. 11 is a view showing internal airflow in a cooking chamber by the convection-heating unit depicted in FIG. 10.

FIG. 9 is a view showing a microwave-heating unit 320 and a grill-heating unit 330 of the cooking apparatus 300 according to the embodiment, FIG. 10 is a view showing a convection-heating unit 340 of the cooking apparatus 300 according to the embodiment, and FIG. 11 is a view showing internal airflow in the cooking chamber 305 by the convection-heating unit 340 depicted in FIG. 10.

Referring to FIGS. 9 and 10, the cooking apparatus 300 includes the microwave-heating unit 320 to radiate microwaves into the cooking chamber 305, the grill-heating unit 330 to emit radiant heat toward materials to be cooked in the cooking chamber 305, and the convection-heating unit 340 to supply hot air into the cooking chamber 305.

The microwave-heating unit 320 is disposed in the electronic chamber 307 provided to the right of the cooking chamber 305. The microwave-heating unit 320 includes a magnetron 321 and a high voltage transformer (not shown). The microwave-heating unit 320 radiates microwaves of 2.45 GHz into the cooking chamber 305 through the right wall plate of the cooking chamber 305, thereby heating materials to be cooked in the cooking chamber 305.

The microwave-heating unit 320 may be configured as a fixed output microwave-heating unit which generates only the microwaves of maximum output power, however embodiments of the present invention are not limited thereto. The microwave-heating unit 320 may also be configured as a variable output microwave-heating unit which radiates microwaves of various powers.

The grill-heating unit 330 is provided at the inner surface of the top plate of the cooking chamber 305. The grill-heating unit 330 includes a grill heater 331 to emit radiant heat. The radiant heat emitted from the grill heater 331 is directly radiated into the cooking chamber 305, or is reflected from the inner surface of the top plate of the cooking chamber 305 and then radiated toward materials to be cooked.

The convection-heating unit 340 is provided to the rear of the cooking chamber 305. The convection-heating unit 340 includes a convection heater 341 to generate hot air, a convection circulation fan 343 to supply the hot air around the convection heater 341 into the cooking chamber 305, and a convection driving motor 345 to rotate the convection circulation fan 343.

The rear wall plate of the cooking chamber 305 has a depressed portion, which defines a circulation fan accommodation space 305*a*. The convection heater 341 and the convection circulation fan 343 are disposed inside the circulation fan accommodation space 305*a*, and the convection driving motor 345 is disposed outside the circulation fan accommodation space 305*a*.

Since the convection heater 341, the convection circulation fan 343 and the convection driving motor 345 are the same as those of the convection heater 141, the convection circulation fan 143 and the convection driving motor 145 of the cooking apparatus 100 according to the embodiment, explanation thereof will be omitted.

Referring to FIG. 11, the hot air heated by the convection heater 341 is supplied into the cooking chamber 305 by the convection circulation fan 343, and then flows toward the front portion of the cooking chamber 305 along the top and bottom surfaces and the left and right surfaces of the cooking chamber 305. After arriving at the door 303 provided to the front of the cooking chamber 305, the hot air gathers at the middle portion of the door 303, and then flows back toward the rear surface across the middle portion of the cooking chamber 305.

Figure 12:
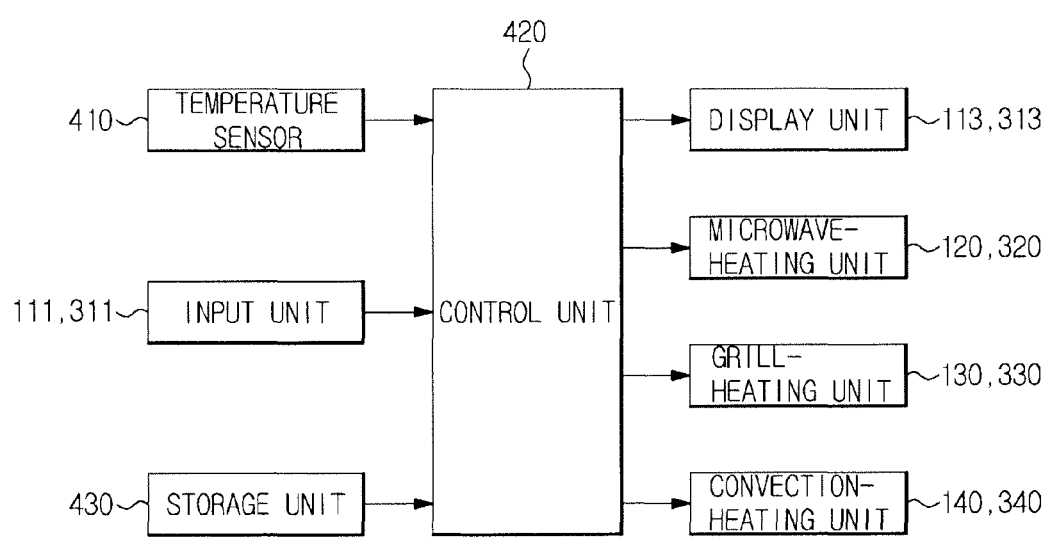
FIG. 12 is a control block diagram of the cooking apparatus according to an embodiments.

FIG. 12 is a control block diagram of the cooking apparatus according to the embodiment.

In order to perform the cooking operation using the hot air, radiant heat or microwaves, the cooking apparatus 100 and 300 includes a temperature sensor 410, an input unit 111 and 311, a display unit 113 and 313, a microwave-heating unit 120 and 320, a grill-heating unit 130 and 330, a convection-heating unit 140 and 340, a control unit 420 and a storage unit 430.

Since the input unit 111 and 311, the display unit 113 and 313, the microwave-heating unit 120 and 320, the grill-heating unit 130 and 330 and the convection-heating unit 140 and 340 have been described above, explanation thereof will be omitted.

The temperature sensor 410 measures the internal temperature of the cooking chamber 105 and 305, and transmits the temperature data to the control unit 410. The temperature sensor 410 may be configured as a thermistor, which is a type of resistor whose resistance varies with temperature.

According to the measurement result from the temperature sensor 410 and the user operation command input through the input unit 111 and 311, the control unit 420 controls the operation of the microwave-heating unit 120 and 320, the grill-heating unit 130 and 330 and the convection-heating unit 140 and 340.

The storage unit 430 stores the operation data corresponding to the above-described fry cooking. The storage unit 430 responds to the operation data request of the control unit 420, and transmits the corresponding operation data to the control unit 420.

Figure 13:
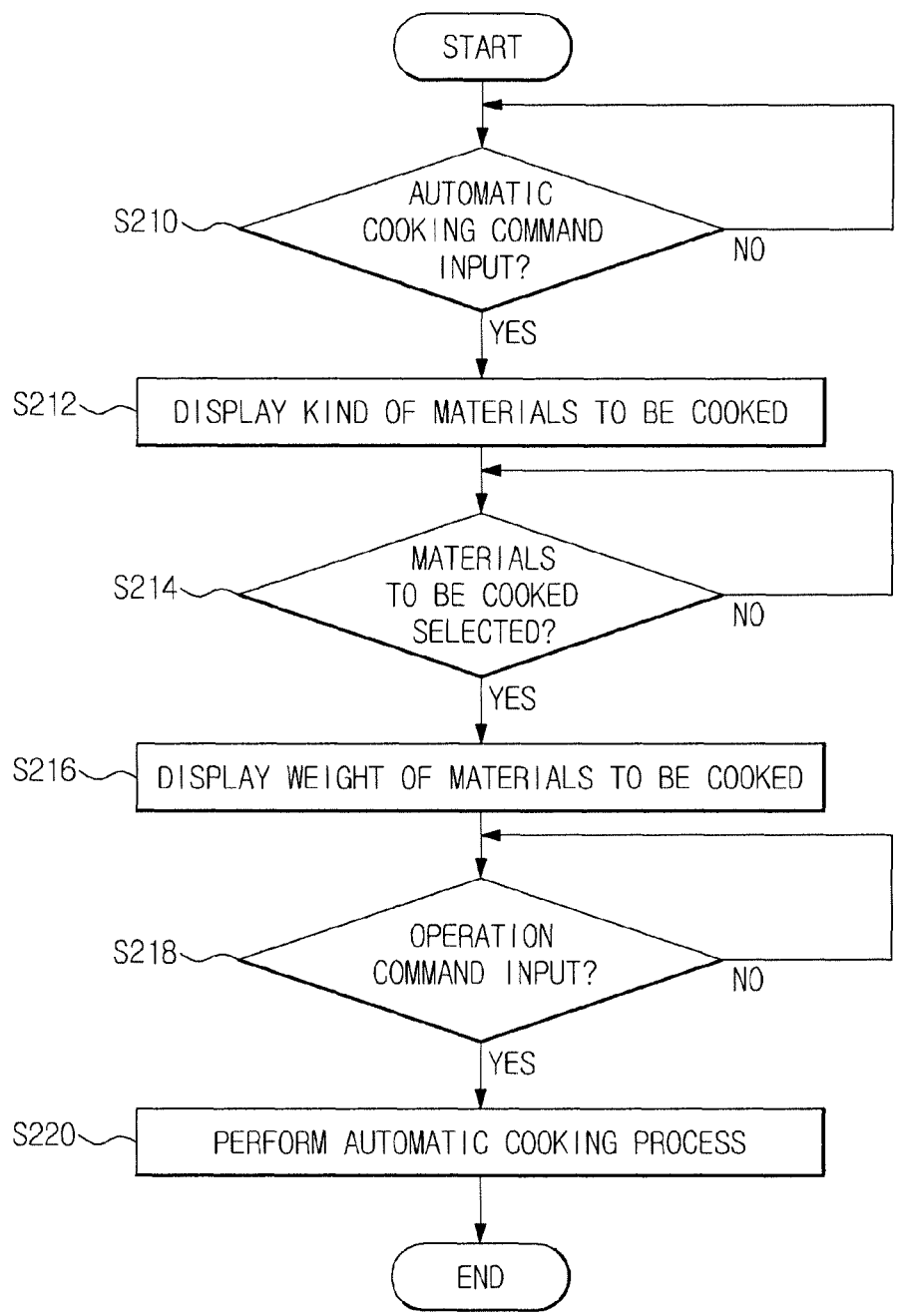
FIG. 13 is a flowchart showing a fry-cooking process of the cooking apparatus according to the embodiment.

FIG. 13 is a flowchart showing a fry-cooking process of the cooking apparatus 100 and 300 according to the embodiment.

Referring to FIG. 13, the cooking apparatus 100 and 300 determines whether a user fry-cooking command is input through the fried food button 111*a* and 311*a* at operation S210.

If the user fry-cooking command is input (Yes at operation S210), the cooking apparatus 100 and 300 displays the kind of fried food through the display unit 113 and 313 according to user selection using the adjustment dial 111*d* and 311*d* at operation S212. For example, if the fry-cooking command is input through the fried food button, the display unit 113 and 313 displays the kind of fried food, such as potato chip, chicken nugget, frozen hotdog, sweet potato stick and the like.

The cooking apparatus 100 and 300 determines whether the user selection command is input through the selection/operation button 111*f* and 311*f* while changing the kind of food displayed on the display unit 113 and 313 at operation S214. In other words, a user may change the kind of food displayed on the display unit 113 and 313 using the adjustment dial 111*d* and 311*d*. When the desired kind of food is displayed on the display unit 113 and 313, the user may select the kind of food using the selection/operation button 111*f* and 311*f*.

If the user food selection command is input, the cooking apparatus 100 and 300 displays the weight of food according to the user selection through the adjustment dial 111*d* and 311*d* at operation S216.

The cooking apparatus 100 and 300 determines whether the user selection command is input through the selection/operation button 111*f* and 311*f* while changing the weight of food displayed on the display unit 113 and 313 at operation S218. In other words, a user may change the weight of food displayed on the display unit 113 and 313 using the adjustment dial 111*d* and 311*d*. When the desired weight of food is displayed on the display unit 113 and 313, the user may select the weight of food using the selection/operation button 111*f* and 311*f*.

If the weight of food is input, the cooking apparatus 100 and 300 performs the fry-cooking operation according to the operation data corresponding to the fried food mode, the kind of food and the weight of food selected by a user at operation S220.

Hereinafter, a method of heating the materials to be cooked of the cooking apparatus 100 and 300 according to the embodiment will be described.

The cooking apparatus 100 and 300 may perform the microwave-heating process, the grill-heating process, the convection-heating process, and the slim fry or healthy fry heating process.

The microwave-heating process entails heating materials to be cooked using the microwaves radiated from the microwave-heating unit 120 and 320. In detail, if a user inputs the microwave-heating command through the input unit 111 and 311, the microwave-heating unit 120 and 320 radiates the microwaves of previously determined power, e.g., 600 W, toward the materials to be cooked in the cooking chamber 105 and 305.

If the previously determined output of the microwaves is lower than the maximum output of the microwave-heating unit 120 and 320, the microwave-heating unit 120 and 320 radiates the microwaves of the previously determined output by repeating turn-on and turn-off. In such a case that the previously determined output of the microwaves is 600 W and the maximum output of the microwave-heating unit 120 and 320 is 900 W, the microwave-heating unit 120 and 320 is repeatedly turned on for 20 seconds and turned off for 10 seconds to radiate the microwaves of 600 W.

The grill-heating process entails heating materials to be cooked using the radiant heat emitted from the grill-heating unit 130 and 330. If a user inputs the grill-heating command through the input unit 111 and 311, the grill-heating unit 130 and 330 emits the radiant heat toward the materials to be cooked in the cooking chamber 105 and 305.

In detail, the grill-heating unit 130 and 330 is activated until the temperature of the cooking chamber 105 and 305 reaches a preset target temperature (e.g., 180° C.). If the temperature of the cooking chamber 105 and 305 exceeds the preset temperature (e.g., 180° C.), the grill-heating unit 130 and 330 is inactivated in order to prevent overheating. Afterward, if the temperature of the cooking chamber 105 and 305 drops below the preset target temperature (e.g., 180° C.), the grill-heating unit 130 and 330 is activated again.

The grill-heating process does not only heat the materials to be cooked, but also cooks the materials so that food may have a crispy texture and brown color similar to food fried in oil.

The convection-heating process entails heating materials to be cooked using the hot air supplied from the convection-heating unit 140 and 340. If a user inputs the convection-heating command, the convection-heating unit 140 and 340 supplies the hot air into the cooking chamber 105 and 305.

In detail, the convection-heating unit 140 and 340 is activated until the temperature of the cooking chamber 105 and 305 reaches a preset target temperature (e.g., 200° C.). If the temperature of the cooking chamber 105 and 305 exceeds the target temperature, the convection-heating unit 140 and 340 is inactivated. Afterward, if the temperature of the cooking chamber 105 and 305 drops below the target temperature, the convection-heating unit 140 and 340 is activated again. The temperature of the cooking chamber 105 and 305 is maintained at the target temperature in the above-described manner. In the case of an automatic cooking process, the target temperature pre-stored in the storage unit 430 may be used. In the case of a manual cooking process, a user may input the desired target temperature through the input unit 111 and 311.

The convection-heating process does not only heat the materials to be cooked, but also evaporates moisture of the surface of the materials to be cooked so that the food may be crispy just like when food is fried.

The slim fry or healthy fry heating process, as an additional heating process for fry-cooking, entails heating materials to be cooked using the radiant heat emitted from the grill-heating unit 130 and 330 and the hot air supplied from the convection-heating unit 140 and 340. That is, the convection-heating unit 140 and 340 is activated together with the grill-heating unit 130 and 330, thereby performing the slim fry heating process.

By activating the grill-heating unit 130 and 330 together with the convection-heating unit 140 and 340, the cooking time may be shortened. Also, the food cooked by the grill-heating process may have a color similar to that fried in oil. The side surface of the food cooked by the convection-heating process is sufficiently heated, and moisture of the surface of the food is evaporated. Accordingly, the food may have a texture similar to food fried in oil.

In detail, the materials to be cooked are heated by the radiant heat from the grill-heating unit 130 and 330 and the hot air from the convection-heating unit 140 and 340 until the temperature of the cooking chamber 105 and 305 reaches a preset target temperature. So as to maintain the target temperature of the cooking chamber 105 and 305, if the temperature of the cooking chamber 105 and 305 exceeds the target temperature, the grill-heating unit 130 and 330 and the convection-heating unit 140 and 340 are repeatedly turned on and off.

The grill-heating unit 130 and 330 and the convection-heating unit 140 and 340 may be turned on and off at the same time. That is, if the temperature of the cooking chamber 105 and 305 drops below the target temperature, the grill-heating unit 130 and 330 and the convection-heating unit 140 and 340 are turned on at the same time. If the temperature of the cooking chamber 105 and 305 exceeds the target temperature, the grill-heating unit 130 and 330 and the convection-heating unit 140 and 340 are turned off at the same time.

Alternatively, if the temperature of the cooking chamber 105 and 305 drops below the target temperature, the convection-heating unit 140 and 340 may start operating. If the temperature of the cooking chamber 105 and 305 exceeds the target temperature, the convection-heating unit 140 and 340 may stop operating. During the operation of the convection-heating unit 140 and 340, the grill-heating unit 130 and 330 may be repeatedly turned on and off.

Alternatively, if the temperature of the cooking chamber 105 and 305 drops below the target temperature, the convection-heating unit 140 and 340 may start operating. If the temperature of the cooking chamber 105 and 305 exceeds the target temperature, the convection-heating unit 140 and 340 may stop operating. When the convection-heating unit 140 and 340 starts operating, the grill-heating unit 130 and 330 may operate together with the convection-heating unit 140 and 340. When the preset time is over or the temperature of the cooking chamber 105 and 305 reaches the target temperature, the grill-heating unit 130 and 330 may stop operating.

The fry-cooking process performed by the cooking apparatus 100 and 300 according to the embodiment will be described hereinafter.

The cooking apparatus 100 and 300 may perform the fry-cooking process as one of the automatic cooking processes. The fry-cooking process may include a microwave-heating stage to heat the core of the food and a slim fry stage to cook the food to have a texture and color similar to that fried in oil.

In the microwave-heating stage, only the microwave-heating process may be performed, the microwave-heating process and the convection-heating process may be performed together, or the microwave-heating process and the grill-heating process may be performed together. In detail, both the core and surface of food are heated by activating only the microwave-heating unit 120 and 320, activating both the microwave-heating unit 120 and 320 and the convection-heating unit 140 and 340, or activating both the microwave-heating unit 120 and 320 and the grill-heating unit 130 and 330.

The core of food is heated by the microwaves from the microwave-heating unit 120 and 320, and the surface of food is heated by the radiant heat from the grill-heating unit 130 and 330 or the hot air from the convection-heating unit 140 and 340. Since the microwave-heating unit 120 and 320 is activated together with the grill-heating unit 130 and 330 or the convection-heating unit 140 and 340, the core as well as the surface of food is sufficiently cooked, and the cooking time is shortened in comparison with the case of activating only the grill-heating unit 130 and 330 or the convection-heating unit 140 and 340.

Then, in the slim fry stage, the convection-heating process of activating the convection-heating unit 140 and 340 may be performed so that the food may have a texture similar to that fried in oil, or the slim fry heating process of simultaneously activating the grill-heating unit 130 and 330 and the convection-heating unit 140 and 340 may be performed so that the food may have a color and texture similar to that fried in oil.

The microwave-heating stage and the slim fry stage may be performed in a random order. The slim fry stage may be first performed to make the surface of the food crispy and the microwave-heating stage may be secondarily performed to heat the core of the food. Alternatively, the microwave-heating stage may be first performed to heat the core of the food and the slim fry stage may be secondarily performed to make the surface of the food crispy. Further, the cooking apparatus 100 and 300 may perform the fry-cooking process in order of the first microwave-heating stage, the slim fry stage and the second microwave-heating stage, or in order of the first slim fry stage, the microwave-heating stage and the second slim fry stage. It may be preferable that the slim fry stage is performed as the final stage of the fry-cooking process, because the crispy texture of the fried food may be maintained for a relatively long time.

Hereinafter, when a user inputs the fry-cooking command, the fry-cooking process of the cooking apparatus 100 and 300 according to the embodiment will be described.

The materials to be cooked are classified into several food groups, and the fry-cooking process of the cooking apparatus 100 and 300 corresponding to each of the food groups will be explained.

A first food group is defined as primarily processed food. The primary processing is the conversion of raw materials to food commodities, and the first food group may include frozen hotdogs, frozen chicken nuggets, frozen potato chips, frozen croquettes, frozen spring rolls and the like. A second food group is defined as non-processed food, and may include drumsticks, raw potato chips, raw potato wedges, raw sweet potato sticks and the like.

A first cooking time, a second cooking time and a third cooking time (which will be described later) may be different from each other according to materials to be cooked and weights of the materials. For example, the first cooking time of the first food group and the first cooking time of the second food group may be different from each other.

Figure 14:
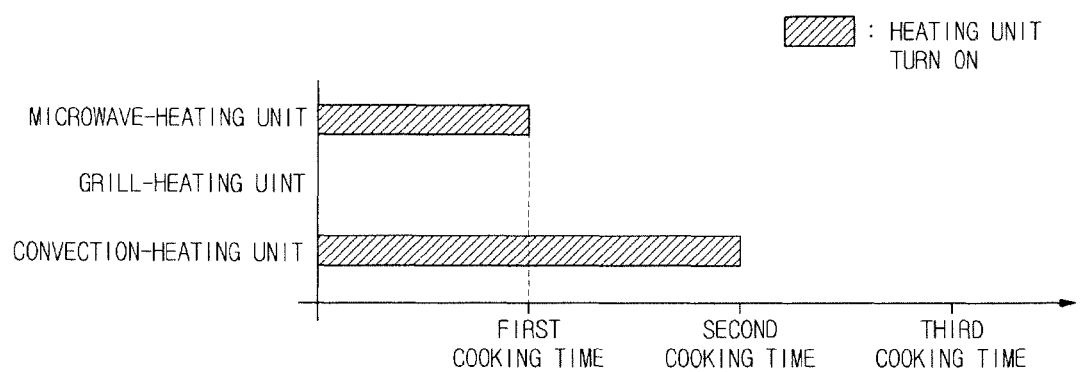
FIGS. 14 and 15 are views showing an exemplary fry-cooking process corresponding to the kind of food groups in the cooking apparatus according to the embodiment.
Figure 15:
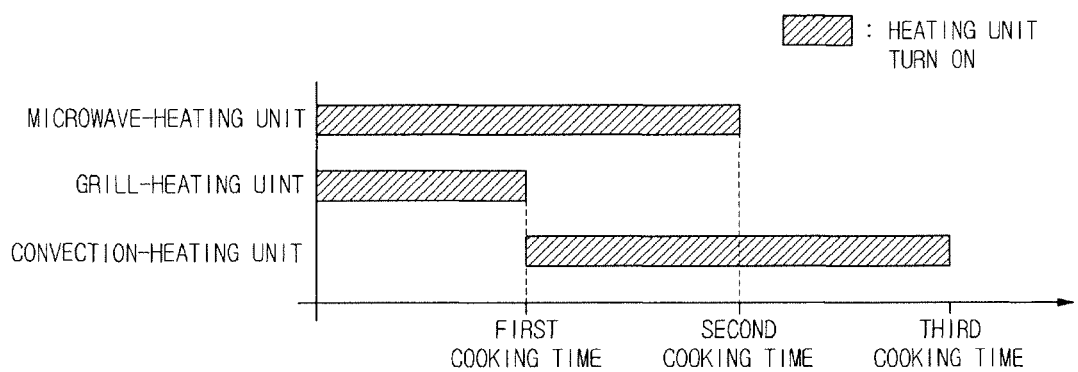

FIGS. 14 and 15 are views showing an exemplary fry-cooking process corresponding to the kind of food groups in the cooking apparatus 100 and 300 according to the embodiment.

If a user inputs the fry-cooking command through the fried food button 111a and 311a, selects the material to be cooked and a weight of the material and inputs the operation command through the selection/operation button 111f and 311f, the cooking apparatus 100 and 300 performs the operation which will be described below.

FIG. 14 shows an exemplary fry-cooking process with respect to the first food group in the cooking apparatus 100 and 300 according to the embodiment. Referring to FIG. 14, the microwave-heating unit 120 and 320 and the convection-heating unit 140 and 340 are activated at the same time for the first cooking time, to thereby perform both the microwave-heating process and the convection-heating process. When the first cooking time is over, the convection-heating unit 140 and 340 remains activated, however, the activation of the microwave-heating unit 120 and 320 is stopped, to thereby perform only the convection-heating process until the second cooking time is over.

Particularly, the microwave-heating unit 120 and 320 is activated together with the convection-heating unit 140 and 340 for the first cooking time. As a result, the food may have a crispy texture by the convection-heating, and also may be cooked to the core by the microwave-heating.

Also, when the first cooking time is over, the activation of the microwave-heating unit 120 and 320 is stopped, however, the convection-heating unit 140 and 340 remains activated until the second cooking time is over. As a result, the food may have a crispier texture.

Some kinds of materials may be cooked through only the convection-heating process without heating the core of the food through the microwave-heating process. For example, the materials having a relatively small thickness, such as frozen potato chips, frozen French fries or the like, may be sufficiently cooked to the core by the convection-heating without the microwave-heating.

FIG. 15 shows an exemplary fry-cooking process with respect to the second food group in the cooking apparatus 100 and 300 according to the embodiments. Referring to FIG. 15, the microwave-heating unit 120 and 320 and the grill-heating unit 130 and 330 are activated at the same time for the first cooking time, to thereby perform both the microwave-heating process and the grill-heating process.

Because the primarily processed food already has a color similar to that fried in oil through the primary processing, the primarily processed food may be sufficiently cooked to have a texture similar to that fried in oil through only the convection-heating process. However, when the non-processed food is cooked, the grill-heating process is performed for the first cooking time so that the food may have a color and texture similar to that fried in oil and the microwave-heating process is also performed for the first cooking time in order to heat the core of the non-processed food.

When the first cooking time is over, the microwave-heating unit 120 and 320 remains activated, however, the activation of the grill-heating unit 130 and 330 is stopped. In addition, the convection-heating unit 140 and 340 starts to be activated. Then, the microwave-heating unit 120 and 320 and the convection-heating unit 140 and 340 are activated at the same time until the second cooking time is over, to thereby perform both the microwave-heating process and the convection-heating process. As a result, the food may have a crispy texture while being heated to the core.

When the second cooking time is over, the activation of the microwave-heating unit 120 and 320 is stopped. However, the convection-heating unit 140 and 340 remains activated to convection-heat the food until the third cooking time is over. As a result, the food may have a crispier texture.

Hereinafter, the fry-cooking process of the cooking apparatus 100 and 300 according to the embodiment will be explained by giving specific examples of materials to be cooked.

FIGS. 16 through 24 are views showing exemplary fry-cooking process corresponding to the kind of materials to be cooked in the cooking apparatus 100 and 300 according to the embodiment.

Referring to the fry-cooking process depicted in FIGS. 16 through 24, the whole fry-cooking process includes a first cooking stage, a second cooking stage and a third cooking stage.

In the case of performing the fry-cooking process through the two cooking stages, the microwave-heating and grill-heating processes or the microwave-heating and convection-heating processes are performed at the first cooking stage, in order to heat the core as well as the surface of food. Then, the slim fry heating process is performed at the second cooking stage. As a result, the food may have a color, texture and taste similar to that fried in oil.

In the case of performing the fry-cooking process through the three cooking stages, the microwave-heating and grill-heating processes and the microwave-heating and convection-heating processes are performed at the first cooking stage and the second cooking stage, respectively, in order to heat the core as well as the surface of food. Then, the slim fry heating process is performed at the third cooking stage. As a result, the food may have a color, texture and taste similar to that fried in oil.

In order that the food is evenly cooked, a user may be warned to turn the food over at intervals between the respective cooking stages. The operation time of each cooking stage may be changed in accordance with the kind of materials to be cooked and a weight of the material.

Numbers in bar graphs illustrated in FIGS. 16 through 24 represent the output of the microwave-heating unit 120 and 320 during the microwave-heating process and the target temperature of the cooking chamber 105 and 305 during the convection-heating process. For example, "600 W" in the bar graph in FIG. 16, which represents the microwave-heating process during the first cooking stage, means that the microwave-heating unit 120 and 320 operates with the power of 600 W. And, "200° C." in the bar graph representing the convection-heating process during the first cooking stage means that the temperature of the cooking chamber 105 and 305 is held at 200° C. by the convection-heating process.

Figure 16:
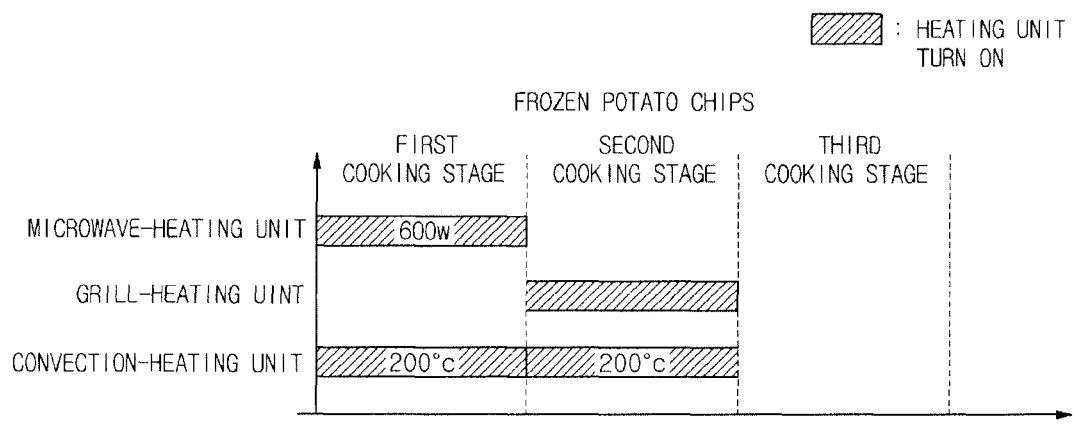
FIGS. 16 through 24 are views showing exemplary fry-cooking process corresponding to the kind of materials to be cooked in the cooking apparatus according to the embodiment.

FIG. 16 is a view showing the fry-cooking process to fry-cook frozen potato chips using the cooking apparatus 100 and 300 according to the embodiment.

In order that the frozen potato chips are evenly cooked, the turntable 104 and 304 is placed in the cooking chamber 105 and 305, and the low rack 102b and 302b is placed on the turntable 104 and 304. The crusty plate 109 and 309 is placed on the low rack 102b and 302b, and the frozen potato chips are placed on the crusty plate 109 and 309. Accordingly, the bottom surfaces of the frozen potato chips are heated by the crusty plate 109 and 309.

Referring to FIG. 16, during the first cooking stage (e.g., whose operation time is 4 minutes for the frozen potato chips of 300 g to 350 g, and 6 minutes for the frozen potato chips of 450 g to 500 g), both the microwave-heating process and the convection-heating process are performed in order to heat the core as well as the surface of the frozen potato chips. For example, the microwave-heating unit 120 and 320 may operate with power of 600 W, and the convection-heating unit 140 and 340 may operate to hold the temperature of the cooking chamber 105 and 305 at the target temperature of 200° C.

As described above, the cooking apparatus 100 and 300 has a feature that the surface of the food is heated by the convection-heating process and the core of the food is also heated by the microwave-heating process. Such a feature makes the cooking time shorter than that of the convection-heating process.

When the first cooking stage is over, a user may be warned to turn over the frozen potato chips in the cooking chamber 105 and 305 in order that the frozen potato chips are evenly cooked.

During the second cooking stage (e.g., whose operation time is 22 minutes for the frozen potato chips of 300 g to 350 g, and 23 minutes for the frozen potato chips of 450 g to 500 g), the slim fry heating process is performed, in which the grill-heating unit 130 and 330 and the convection-heating unit 140 and 340 operate at the same time. For example, the grill-heating unit 130 and 330 and the convection-heating unit 140 and 340 may operate at the same time to maintain the target temperature of 200° C. Since the temperature of the cooking chamber 105 and 305 has already reached 200° C. by the convection-heating process performed during the first cooking stage, the grill-heating unit 130 and 330 and the convection-heating unit 140 and 340 are turned on and off at the same time. As a result, the cooked potato chips may have a color, texture and taste similar to food fried in oil.

Due to the operation of performing the grill-heating process together with the convection-heating process, the cooking time may be shortened and the food may have a color similar to that fried in oil. In addition, due to the operation of performing the convection-heating process together with the grill-heating process, the overall surface of food may have a texture similar to food fried in oil.

Figure 17:
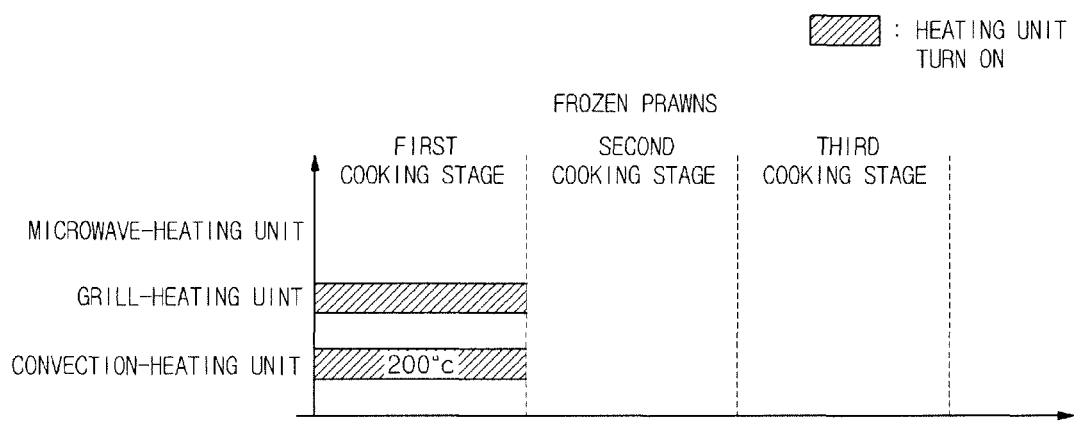

FIG. 17 is a view showing the fry-cooking process to fry-cook frozen prawns using the cooking apparatus 100 and 300 according to the embodiment.

In order that the frozen prawns are evenly cooked, the turntable 104 and 304 is placed in the cooking chamber 105 and 305, and the low rack 102b and 302b is placed on the turntable 104 and 304. The crusty plate 109 and 309 is placed on the low rack 102b and 302b, and the frozen prawns are placed on the crusty plate 109 and 309. Accordingly, the bottom surfaces of the frozen prawns are heated by the crusty plate 109 and 309.

Referring to FIG. 17, during the first cooking stage (e.g., whose operation time is 12 minutes for the frozen prawns of 200 g to 250 g, and 15 minutes for the frozen prawns of 300 g to 350 g), the slim fry heating process is performed, in which the grill-heating unit 130 and 330 and the convection-heating unit 140 and 340 operate at the same time. For example, the grill-heating unit 130 and 330 and the convection-heating unit 140 and 340 may operate to maintain the target temperature of 200° C. When fry-cooking the frozen prawns, because the process of heating the cooking chamber 105 and 305 in advance using the convection-heating or grill-heating process is not performed, the grill-heating unit 130 and 330 and the convection-heating unit 140 and 340 are activated at the same time until the internal temperature of the cooking chamber 105 and 305 reaches the target temperature of 200° C. When the internal temperature of the cooking chamber 105 and 305 reaches the target temperature of 200° C., the grill-heating unit 130 and 330 and the convection-heating unit 140 and 340 are turned on and off at the same time. As a result, the prawns cooked in the cooking apparatus 100 and 300 may have a color, texture and taste similar to food fried in oil.

Figure 18:
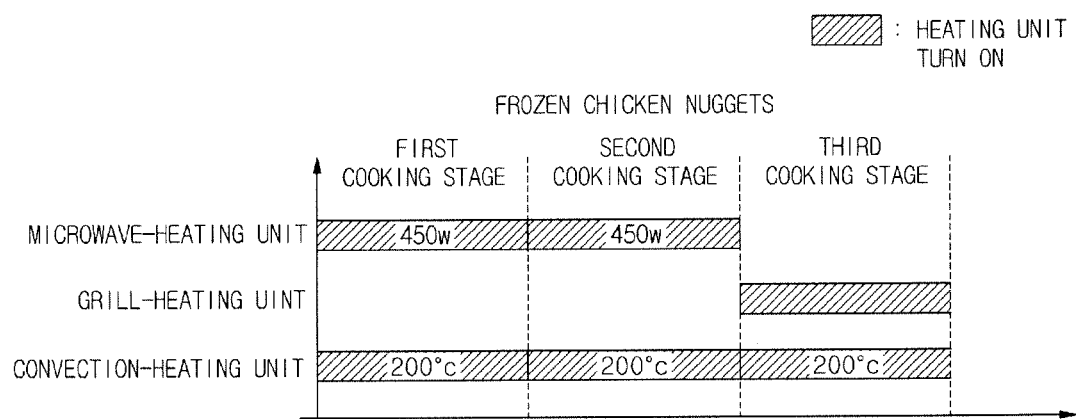

FIG. 18 is a view showing the fry-cooking process to fry-cook frozen chicken nuggets using the cooking apparatus 100 and 300 according to the embodiment.

In order that the frozen chicken nuggets are evenly cooked, the turntable 104 and 304 is placed in the cooking chamber 105 and 305, and the low rack 102b and 302b is placed on the turntable 104 and 304. The crusty plate 109 and 309 is placed on the low rack 102b and 302b, and the frozen chicken nuggets are placed on the crusty plate 109 and 309. Accordingly, the bottom surfaces of the frozen chicken nuggets are heated by the crusty plate 109 and 309.

Referring to FIG. 18, during the first cooking stage (e.g., whose operation time is 5 minutes for the frozen chicken nuggets of 200 g to 250 g, and 6 minutes for the frozen chicken nuggets of 350 g to 400 g), both the microwave-heating process and the convection-heating process are performed in order to heat the core as well as the surface of the frozen chicken nuggets. For example, the microwave-heating unit 120 and 320 may operate with power of 450 W, and the convection-heating unit 140 and 340 may operate to maintain the target temperature of 200° C.

When the first cooking stage is over, a user may be warned to turn over the frozen chicken nuggets in the cooking chamber 105 and 305 in order that the frozen chicken nuggets are evenly cooked.

During the second cooking stage (e.g., whose operation time is 2 minutes for the frozen chicken nuggets of 200 g to 250 g, and 3 minutes for the frozen chicken nuggets of 350 g to 400 g), both the microwave-heating process and the convection-heating process are performed in order to sufficiently heat the core as well as the surface of the chicken nuggets. For example, the microwave-heating unit 120 and 320 may operate with power of 450 W, and the convection-heating unit 140 and 340 may operate to maintain the target temperature of 200° C.

During the third cooking stage (e.g., whose operation time is 5 minutes for the frozen chicken nuggets of 200 g to 250 g, and 5 minutes for the frozen chicken nuggets of 350 g to 400 g), the slim fry heating process is performed, in which the grill-heating unit 130 and 330 and the convection-heating unit 140 and 340 operate at the same time. For example, the grill-heating unit 130 and 330 and the convection-heating unit 140 and 340 may operate at the same time to maintain the target temperature of 200° C. Since the temperature of the cooking chamber 105 and 305 has already reached 200° C. by the convection-heating process performed during the first and second cooking stages, the grill-heating unit 130 and 330 and the convection-heating unit 140 and 340 are turned on and off at the same time. As a result, the cooked chicken nuggets may have a color, texture and taste similar to food fried in oil.

Figure 19:
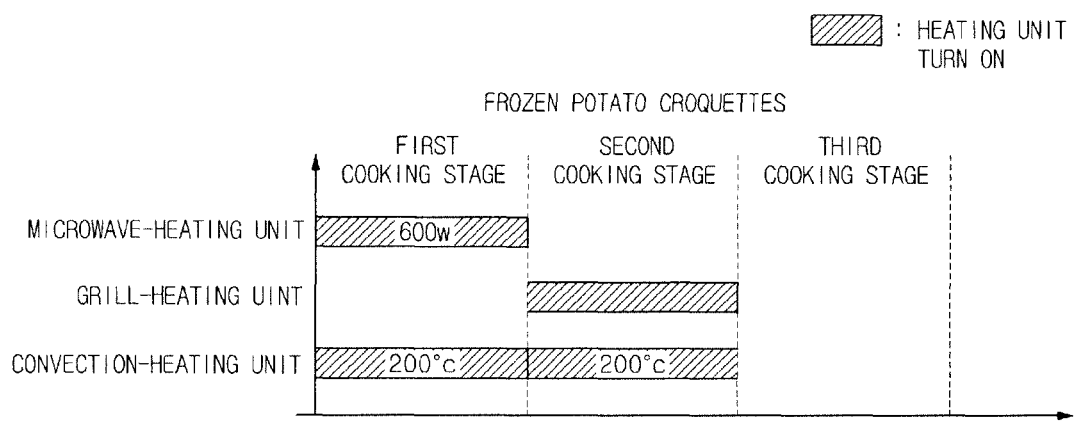

FIG. 19 is a view showing the fry-cooking process to fry-cook frozen potato croquettes using the cooking apparatus 100 and 300 according to the embodiment.

In order that the frozen potato croquettes are evenly cooked, the turntable 104 and 304 is placed in the cooking chamber 105 and 305, and the low rack 102b and 302b is placed on the turntable 104 and 304. The crusty plate 109 and 309 is placed on the low rack 102b and 302b, and the frozen potato croquettes are placed on the crusty plate 109 and 309. Accordingly, the bottom surfaces of the frozen potato croquettes are heated by the crusty plate 109 and 309.

Referring to FIG. 19, during the first cooking stage (e.g., whose operation time is 4 minutes for the frozen potato croquettes of 200 g to 250 g, and 5 minutes for the frozen potato croquettes of 300 g to 350 g), both the microwave-heating process and the convection-heating process are performed in order to heat the core as well as the surface of the frozen potato croquettes. For example, the microwave-heating unit 120 and 320 may operate with power of 600 W, and the convection-heating unit 140 and 340 may operate to maintain the target temperature of 200° C.

During the second cooking stage (e.g., whose operation time is 12 minutes for the frozen potato croquettes of 200 g to 250 g, and 14 minutes for the frozen potato croquettes of 300 g to 350 g), the slim fry heating process is performed, in which the grill-heating unit 130 and 330 and the convection-heating unit 140 and 340 operate at the same time. For example, the grill-heating unit 130 and 330 and the convection-heating unit 140 and 340 may operate at the same time to maintain the target temperature of 200° C. Since the temperature of the cooking chamber 105 and 305 has already reached 200° C. by the convection-heating process performed during the first cooking stage, the grill-heating unit 130 and 330 and the convection-heating unit 140 and 340 are turned on and off at the same time. As a result, the cooked potato croquettes may have a color, texture and taste similar to food fried in oil.

Figure 20:
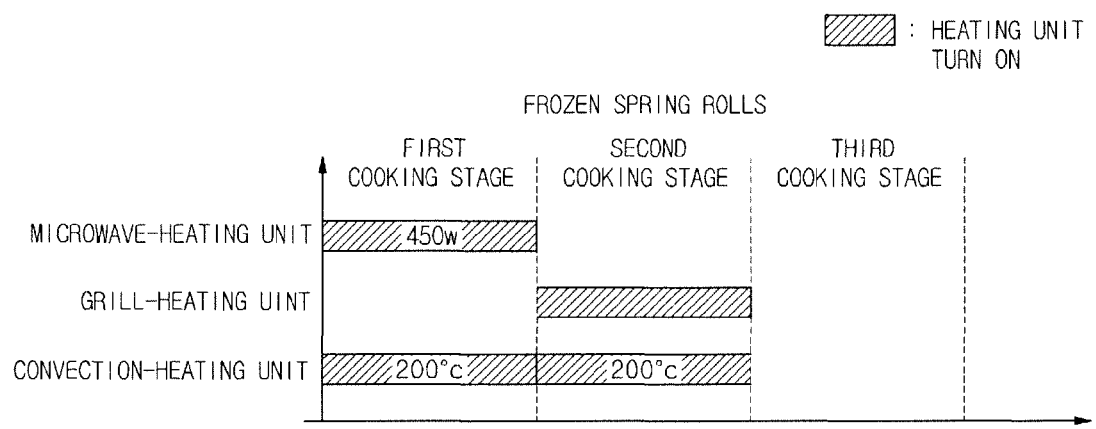

FIG. 20 is a view showing the fry-cooking process to fry-cook frozen spring rolls using the cooking apparatus 100 and 300 according to the embodiment.

In order that the frozen spring rolls are evenly cooked, the turntable 104 and 304 is placed in the cooking chamber 105 and 305, and the low rack 102b and 302b is placed on the turntable 104 and 304. The crusty plate 109 and 309 is placed on the low rack 102b and 302b, and the frozen spring rolls are placed on the crusty plate 109 and 309. Accordingly, the bottom surfaces of the frozen spring rolls are heated by the crusty plate 109 and 309.

Referring to FIG. 20, during the first cooking stage (e.g., whose operation time is 3 minutes for the frozen spring rolls of 200 g to 250 g, and 5 minutes for the frozen spring rolls of 350 g to 400 g), both the microwave-heating process and the convection-heating process are performed in order to heat the core as well as the surface of the frozen spring rolls. For example, the microwave-heating unit 120 and 320 may operate with power of 450 W, and the convection-heating unit 140 and 340 may operate to maintain the target temperature of 200° C.

During the second cooking stage (e.g., whose operation time is 5 minutes for the frozen spring rolls of 200 g to 250 g, and 7 minutes for the frozen spring rolls of 350 g to 400 g), the slim fry heating process is performed, in which the grill-heating unit 130 and 330 and the convection-heating unit 140 and 340 operate at the same time. For example, the grill-heating unit 130 and 330 and the convection-heating unit 140 and 340 may operate at the same time to maintain the target temperature of 200° C. Since the temperature of the cooking chamber 105 and 305 has already reached 200° C. by the convection-heating process performed during the first cooking stage, the grill-heating unit 130 and 330 and the convection-heating unit 140 and 340 are turned on and off at the same time. As a result, the cooked spring rolls may have a color, texture and taste similar to food fried in oil.

Figure 21:
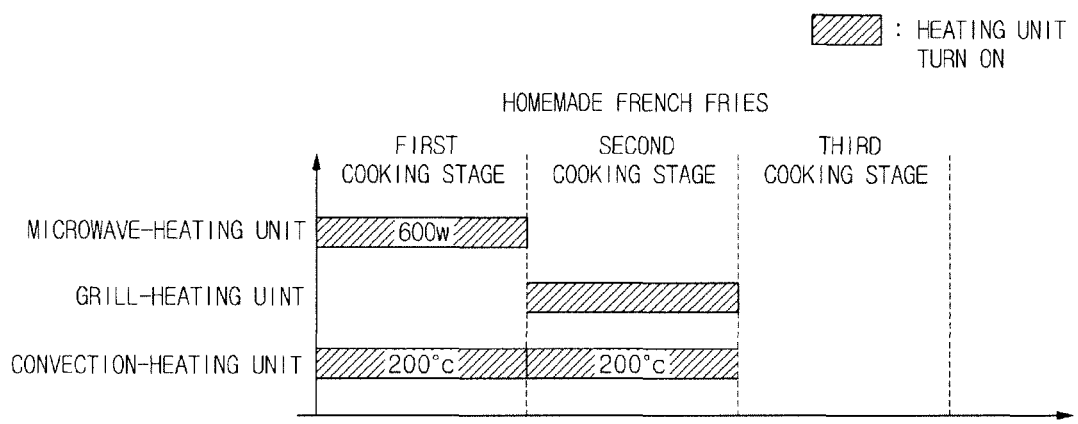

FIG. 21 is a view showing the fry-cooking process to fry-cook homemade French fries using the cooking apparatus 100 and 300 according to the embodiment.

In order that the homemade French fries are evenly cooked, the turntable 104 and 304 is placed in the cooking chamber 105 and 305, and the low rack 102b and 302b is placed on the turntable 104 and 304. The crusty plate 109 and 309 is placed on the low rack 102b and 302b, and the homemade French fries are placed on the crusty plate 109 and 309. Accordingly, the bottom surfaces of the homemade French fries are heated by the crusty plate 109 and 309.

Referring to FIG. 21, during the first cooking stage (e.g., whose operation time is 8 minutes for the homemade French fries of 300 g to 350 g, and 14 minutes for the homemade French fries of 450 g to 500 g), both the microwave-heating process and the convection-heating process are performed in order to heat the core as well as the surface of the homemade French fries. For example, the microwave-heating unit 120 and 320 may operate with power of 600 W, and the convection-heating unit 140 and 340 may operate to maintain the target temperature of 200° C.

When the first cooking stage is over, a user may be warned to turn over the homemade French fries in the cooking chamber 105 and 305 in order that the homemade French fries are evenly cooked.

During the second cooking stage (e.g., whose operation time is 18 minutes for the homemade French fries of 300 g to 350 g, and 20 minutes for the homemade French fries of 450 g to 500 g), the slim fry heating process is performed, in which the grill-heating unit 130 and 330 and the convection-heating unit 140 and 340 operate at the same time. For example, the grill-heating unit 130 and 330 and the convection-heating unit 140 and 340 may operate at the same time to maintain the target temperature of 200° C. Since the temperature of the cooking chamber 105 and 305 has already reached 200° C. by the convection-heating process performed during the first cooking stage, the grill-heating unit 130 and 330 and the convection-heating unit 140 and 340 are turned on and off at the same time. As a result, the cooked homemade French fries may have a color, texture and taste similar to food fried in oil.

Figure 22:
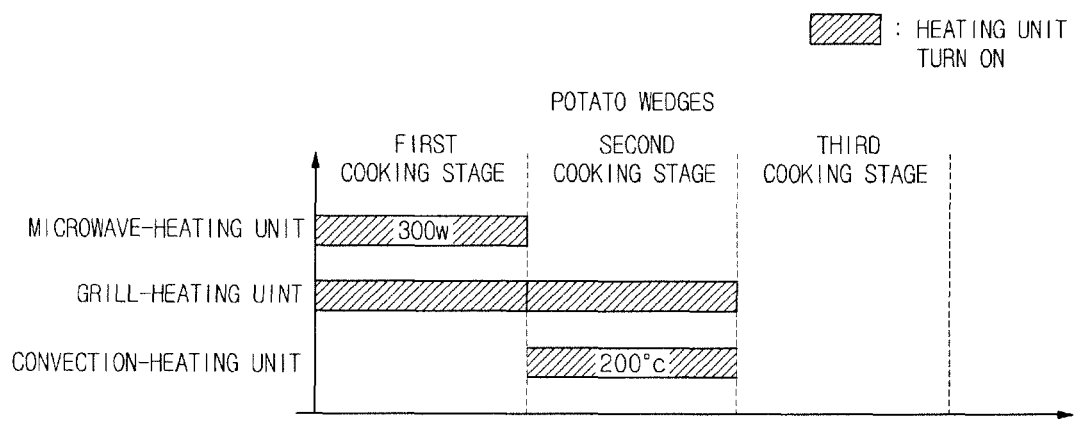

FIG. 22 is a view showing the fry-cooking process to fry-cook potato wedges using the cooking apparatus 100 and 300 according to the embodiment.

In order that the potato wedges are evenly cooked, the turntable 104 and 304 is placed in the cooking chamber 105 and 305, and the high rack 102*a* and 302*a* is placed on the turntable 104 and 304 so that the potato wedges may be sufficiently cooked by the radiant heat emitted from the grill-heating unit 130 and 330. The crusty plate 109 and 309 is placed on the high rack 102*a* and 302*a*, and the potato wedges are placed on the crusty plate 109 and 309. Accordingly, the bottom surfaces of the potato wedges are heated by the crusty plate 109 and 309.

Referring to FIG. 22, during the first cooking stage (e.g., whose operation time is 10 minutes for the potato wedges of 200 g to 250 g, 12 minutes for the potato wedges of 300 g to 350 g, and 14 minutes for the potato wedges of 400 g to 450 g), both the microwave-heating process and the grill-heating process are performed in order to heat the core as well as the surface of the potato wedges. Because the potato wedges are not pre-processed food, it may be difficult to have a color similar to food fried in oil through the convection-heating process. Accordingly, when cooking the potato wedges, the grill-heating process is performed together with the microwave-heating process during the first cooking stage. For example, the microwave-heating unit 120 and 320 and the grill-heating unit 130 and 330 may operate with power of 300 W.

During the second cooking stage (e.g., whose operation time is 5 minutes for the potato wedges of 200 g to 250 g, 5 minutes for the potato wedges of 300 g to 350 g, and 5 minutes for the potato wedges of 400 g to 450 g), the slim fry heating process is performed, in which the grill-heating unit 130 and 330 and the convection-heating unit 140 and 340 operate at the same time. For example, the grill-heating unit 130 and 330 and the convection-heating unit 140 and 340 may operate at the same time to maintain the target temperature of 200° C. Since the temperature of the cooking chamber 105 and 305 has already reached 200° C. by the grill-heating process performed during the first cooking stage, the grill-heating unit 130 and 330 and the convection-heating unit 140 and 340 are turned on and off at the same time. As a result, the cooked potato wedges may have a color, texture and taste similar to food fried in oil.

Figure 23:
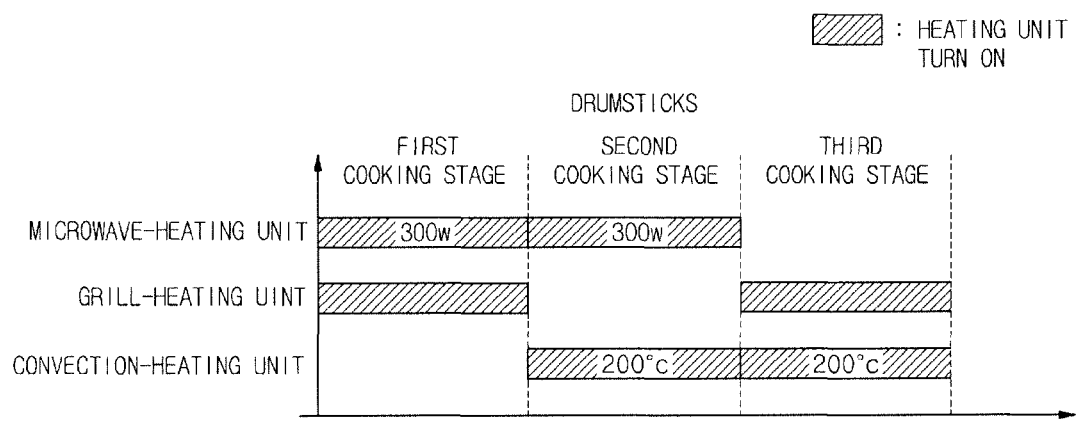

FIG. 23 is a view showing the fry-cooking process to fry-cook drumsticks using the cooking apparatus 100 and 300 according to the embodiment.

In order that the drumsticks are evenly cooked, the turntable 104 and 304 is placed in the cooking chamber 105 and 305, and the high rack 102*a* and 302*a* is placed on the turntable 104 and 304 so that the drumsticks may be cooked by the radiant heat emitted from the grill-heating unit 130 and 330. The drumsticks are placed on the high rack 102*a* and 302*a* to remove fat therefrom.

Referring to FIG. 23, during the first cooking stage (e.g., whose operation time is 10 minutes for the drumsticks of 200 g to 250 g, 11 minutes for the drumsticks of 300 g to 350 g, and 13 minutes for the drumsticks of 400 g to 450 g), both the microwave-heating process and the grill-heating process are performed in order to heat the core as well as the surface of the drumsticks. Because the drumsticks are not previously-processed food, it may be difficult to have a color similar to food fried in oil through the convection-heating process. Accordingly, when cooking the drumsticks, the grill-heating process is performed together with the microwave-heating process during the first cooking stage. For example, the microwave-heating unit 120 and 320 and the grill-heating unit 130 and 330 may operate with power of 300 W.

When the first cooking stage is over, a user may be warned to turn over the drumsticks in the cooking chamber 105 and 305 in order that the drumsticks are evenly cooked. Because the crusty plate 109 and 309 is not used to remove fat from the drumsticks as described above, the bottom surfaces of the drumsticks may not be sufficiently heated. Therefore, a user may be recommended to pause the cooking process while being warned to turn the drumsticks over.

During the second cooking stage (e.g., whose operation time is 7 minutes for the drumsticks of 200 g to 250 g, 8 minutes for the drumsticks of 300 g to 350 g, and 9 minutes for the drumsticks of 400 g to 450 g), both the microwave-heating process and the convection-heating process are performed in order to heat the core as well as the surface of the drumsticks. For example, the microwave-heating unit 120 and 320 may operate with power of 300 W, and the convection-heating unit 140 and 340 may operate to maintain the target temperature of 200° C.

During the third cooking stage (e.g., whose operation time is 7 minutes for the drumsticks of 200 g to 250 g, 7 minutes for the drumsticks of 300 g to 350 g, and 8 minutes for the drumsticks of 400 g to 450 g), the slim fry heating process is performed, in which the grill-heating unit 130 and 330 and the convection-heating unit 140 and 340 operate at the same time. For example, the grill-heating unit 130 and 330 and the convection-heating unit 140 and 340 may operate at the same time to maintain the target temperature of 200° C. Since the temperature of the cooking chamber 105 and 305 has already reached 200° C. by the convection-heating and grill-heating processes performed during the first and second cooking stages, the grill-heating unit 130 and 330 and the convection-heating unit 140 and 340 are turned on and off at the same time. As a result, the cooked drumsticks may have a color, texture and taste similar to food fried in oil.

Figure 24:
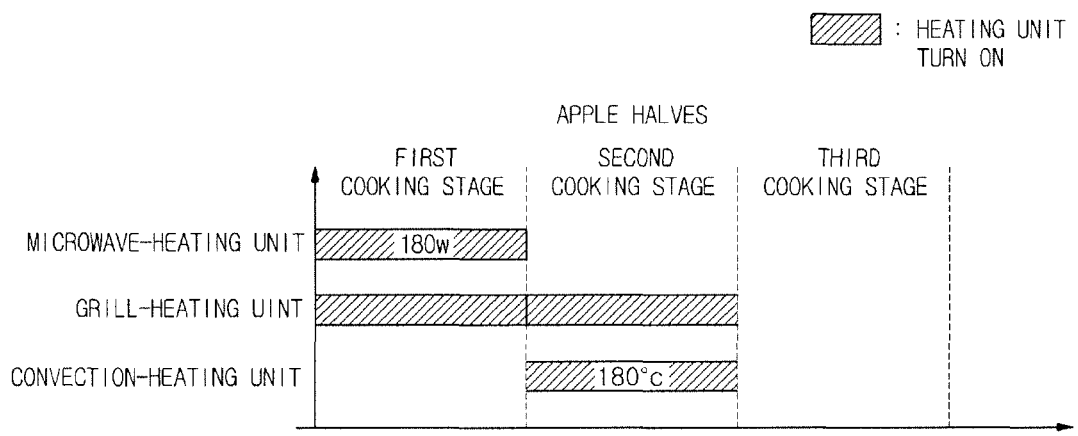

FIG. 24 is a view showing the fry-cooking process to fry-cook apple halves using the cooking apparatus 100 and 300 according to the embodiment.

In order that the apple halves are evenly cooked, the turntable 104 and 304 is placed in the cooking chamber 105 and 305, and the low rack 102*b* and 302*b* is placed on the turntable 104 and 304. The crusty plate 109 and 309 is placed on the low rack 102*b* and 302*b*, and the apple halves are placed on the crusty plate 109 and 309. Accordingly, the bottom surfaces of the apple halves are heated by the crusty plate 109 and 309.

Referring to FIG. 24, during the first cooking stage (e.g., whose operation time is 6 minutes for the apple halves of 300 g to 350 g, and 9 minutes for the apple halves of 400 g to 450 g), both the microwave-heating process and the grill-heating process are performed in order to heat the core as well as the surface of the apple halves. For example, the microwave-heating unit 120 and 320 and the grill-heating unit 130 and 330 may operate with power of 180 W.

During the second cooking stage (e.g., whose operation time is 4 minutes for the apple halves of 300 g to 350 g, and 3 minutes for the apple halves of 400 g to 450 g), the slim fry heating process is performed, in which the grill-heating unit 130 and 330 and the convection-heating unit 140 and 340 operate at the same time. For example, the grill-heating unit 130 and 330 and the convection-heating unit 140 and 340 may operate at the same time to maintain the target temperature of 180° C. Since the temperature of the cooking chamber 105 and 305 has already reached 180° C. by the grill-heating process performed during the first cooking stage, the grill-heating unit 130 and 330 and the convection-heating unit 140 and 340 are turned on and off at the same time. As a result, the cooked apple halves may have a color, texture and taste similar to food fried in oil.

FIG. 25 is a table abstracting the whole cooking methods depicted in FIGS. 16 through 24.

Referring to FIG. 25, the slim fry cooking mode includes the operation of performing the slim fry heating process during the last cooking stage, in which the convection-heating unit 140 and 340 and the grill-heating unit 130 and 330 operate at the same time. Accordingly, the cooked food may have a color, texture and taste similar to food fried in oil.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A cooking apparatus comprising:
a cooking chamber;
a microwave heater configured to radiate microwaves to the cooking chamber;
a heat convector including a convection heater configured to generate hot air and a convection fan configured to circulate the hot air to the cooking chamber;
a grill heater configured to generate radiant heat to the cooking chamber;
a control panel configured to receive from a user a cooking command based on a user selection of a food to be cooked and a user selection of a weight thereof; and
a controller electrically connected to the control panel, the microwave heater, the heat convector and the grill heater, and configured to control a cooking process for a duration of a first heating stage and a second heating stage, wherein
during the first heating stage the controller is configured to control the microwave heater so that the microwave heater radiates microwaves at a predetermined output power corresponding to the cooking command, and to control one of the heat convector and the grill heater to repeat heating and stopping heating to control an internal temperature of the cooking chamber corresponding to the cooking command while controlling another of the heat convector and the grill heater to stop the heating,
during the second heating stage the controller is configured to control the microwave heater so that the radiating of the microwaves stops, and to control both the grill heater and the heat convector to repeat heating and stopping, to control the internal temperature of the cooking chamber corresponding to the cooking command,
the controller is further configured to sequentially perform the first heating stage and the second heating stage, in response to the cooking command and
during the first heating stage the controller is configured to control the microwave heater so that the microwave heater radiates microwaves at a first predetermined output power according to a user selection of a first food to be cooked and control the microwave heater so that the microwave heater radiates microwaves at a second predetermined output power according to a user selection of a second food to be cooked, the first predetermined output power is different from the second predetermined output power, and the first food to be cooked is different from the second food to be cooked.

2. The cooking apparatus of claim 1, wherein, during the second heating stage, the controller is configured to turn on the grill heater and the heat convector while controlling the microwave heater so that the radiating of the microwaves stops, in response to the internal temperature of cooking chamber being below a preset target temperature.

3. The cooking apparatus of claim 2, wherein, during the second heating stage, the controller is configured to turn off the grill heater and the heat convector while controlling the microwave heater so that the radiating of the microwaves stops, in order to maintain the preset target temperature.

4. The cooking apparatus of claim 1, wherein when the first heating stage is completed, the controller is configured to control the microwave heater so that the radiating of the microwaves stops.

5. The cooking apparatus of claim 1, wherein when the first heating stage is completed, the controller is configured to maintain turning on the one of the heat convector and the grill heater which is turned on in the first heating stage while controlling the microwave heater so that the radiating of the microwaves stops.

6. The cooking apparatus of claim 1, further comprising a temperature sensor connected to the controller to measure an internal temperature of the cooking chamber,
wherein, in the second heating stage, the controller is configured continuously turn on the heat convector and the grill heater until the internal temperature, measured by the temperature sensor, of the cooking chamber reaches a preset target temperature, and intermittently turn on and off the heat convector and the grill heater after reaching the preset target temperature in order to maintain the internal temperature of the cooking chamber at the preset target temperature.

7. The cooking apparatus of claim 1, further comprising a temperature sensor connected to the controller to measure an internal temperature of the cooking chamber,
wherein, in the second heating stage, when the controller is configured to determine that the temperature, measured by the temperature sensor, of the cooking chamber is greater than a preset target temperature, the controller is configured to turn off at least one of the heat convector and the grill heater in order to maintain the preset target temperature, and when the controller determines that the temperature, measured by the temperature sensor, of the cooking chamber is less than the preset target temperature, the controller is configured to turn back on the at least one of the heat convector and the grill heater which is turned off in the second heating stage in order to maintain the preset target temperature.

8. The cooking apparatus of claim 1, further comprising a temperature sensor connected to the controller to measure an internal temperature of the cooking chamber,
   wherein in the second heating stage, once the controller is configured to determine that the internal temperature, measured by the temperature sensor, of the cooking chamber reaches a preset target temperature, the controller is configured to repeatedly turn on and off the at least one of the heat convector and the grill heater during the second heating stage in order to maintain the preset target temperature.

9. The cooking apparatus of claim 1, wherein based on the substance and the weight of the substance input by the user the controller determines a cooking time and a power level to be used for the cooking.

10. The cooking apparatus of claim 1, wherein the controller is configured to perform the first heating stage for a first time and perform the second heating stage for a second time, and the first time is different than the second time.

\* \* \* \* \*